Jan. 4, 1966  R. W. WAYMAN  3,226,927
CONTROLS FOR POWER TRANSMISSION
Original Filed June 5, 1950  7 Sheets-Sheet 4

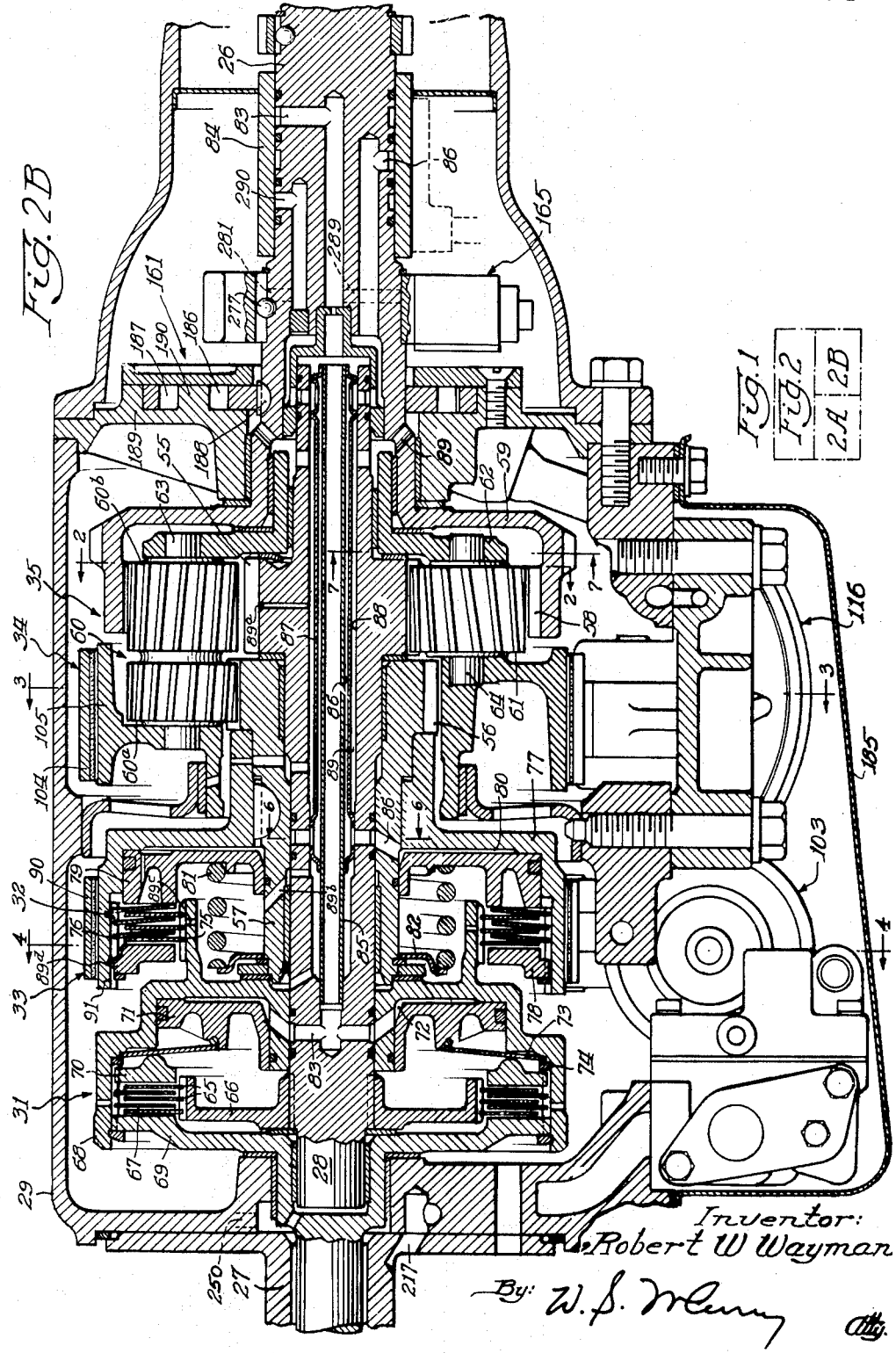

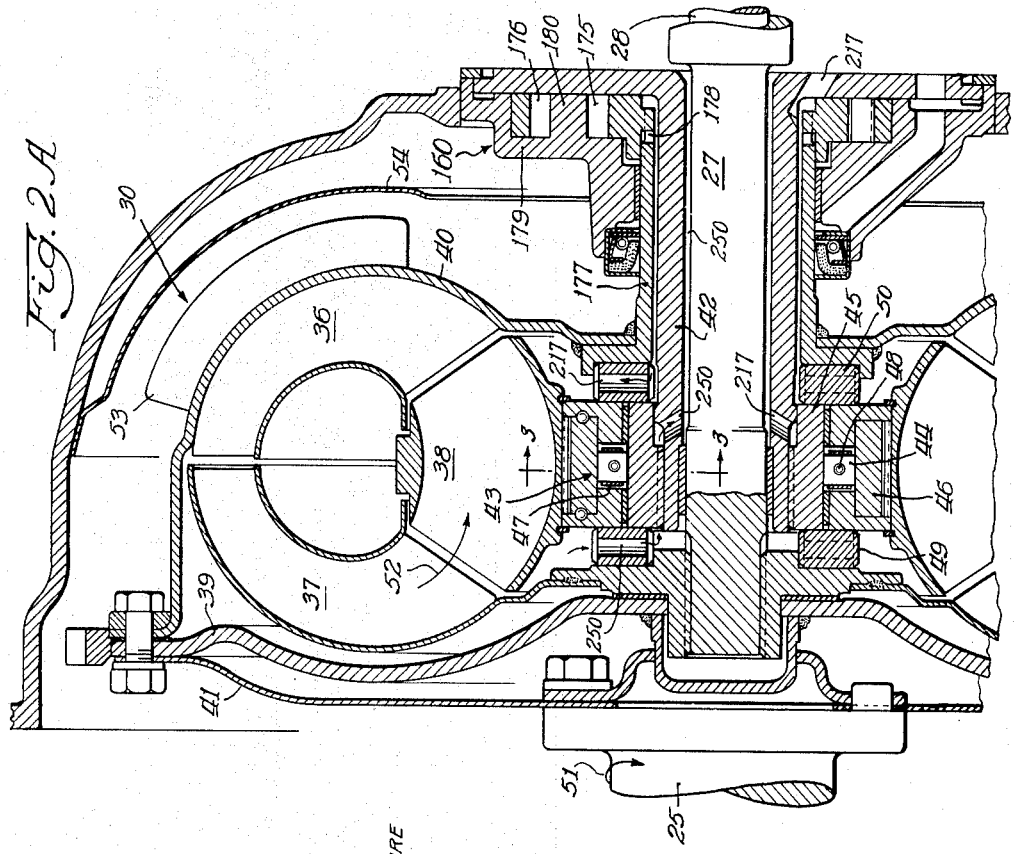

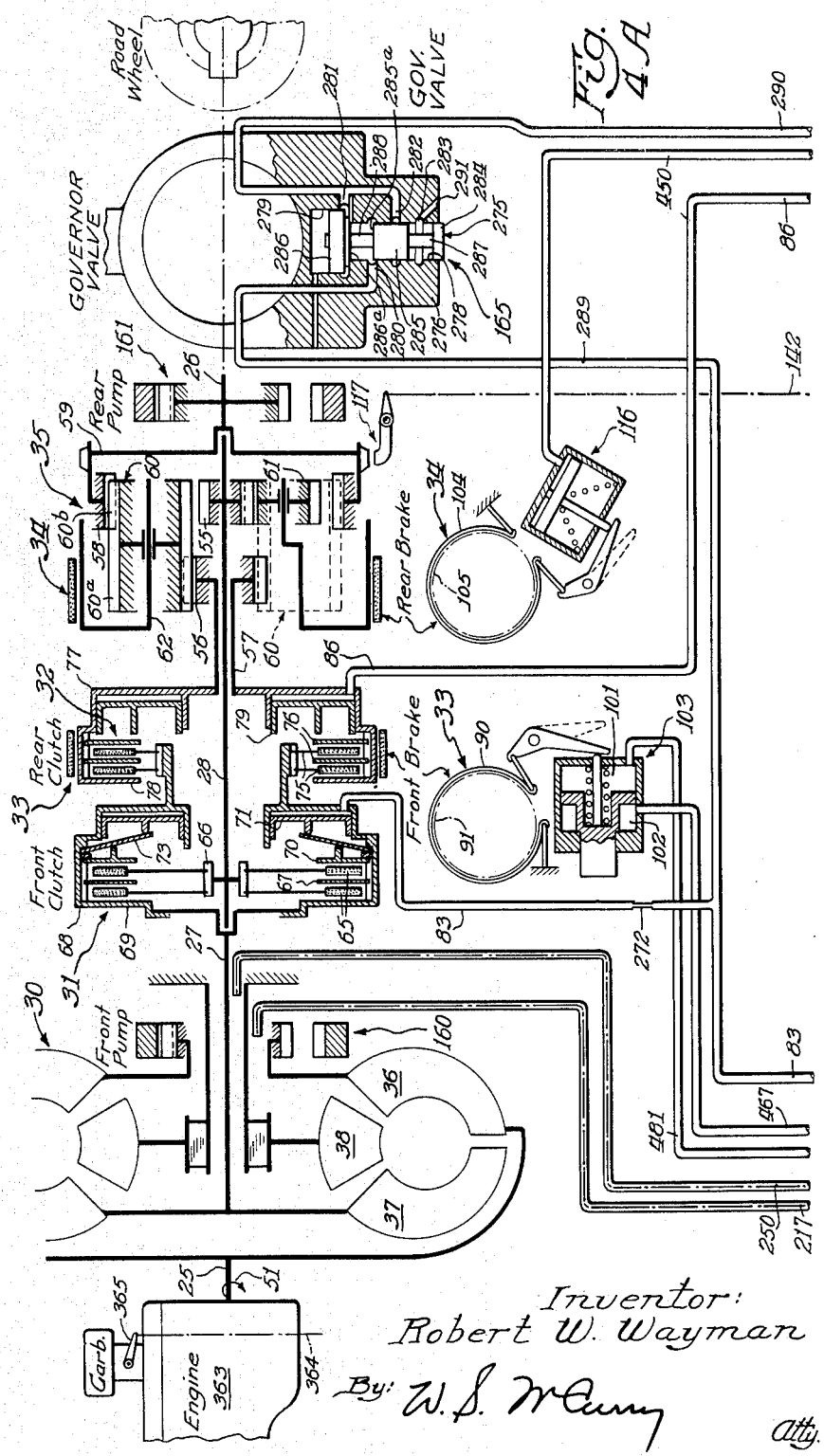

Inventor:
Robert W. Wayman
By: W. S. McCurry
Atty.

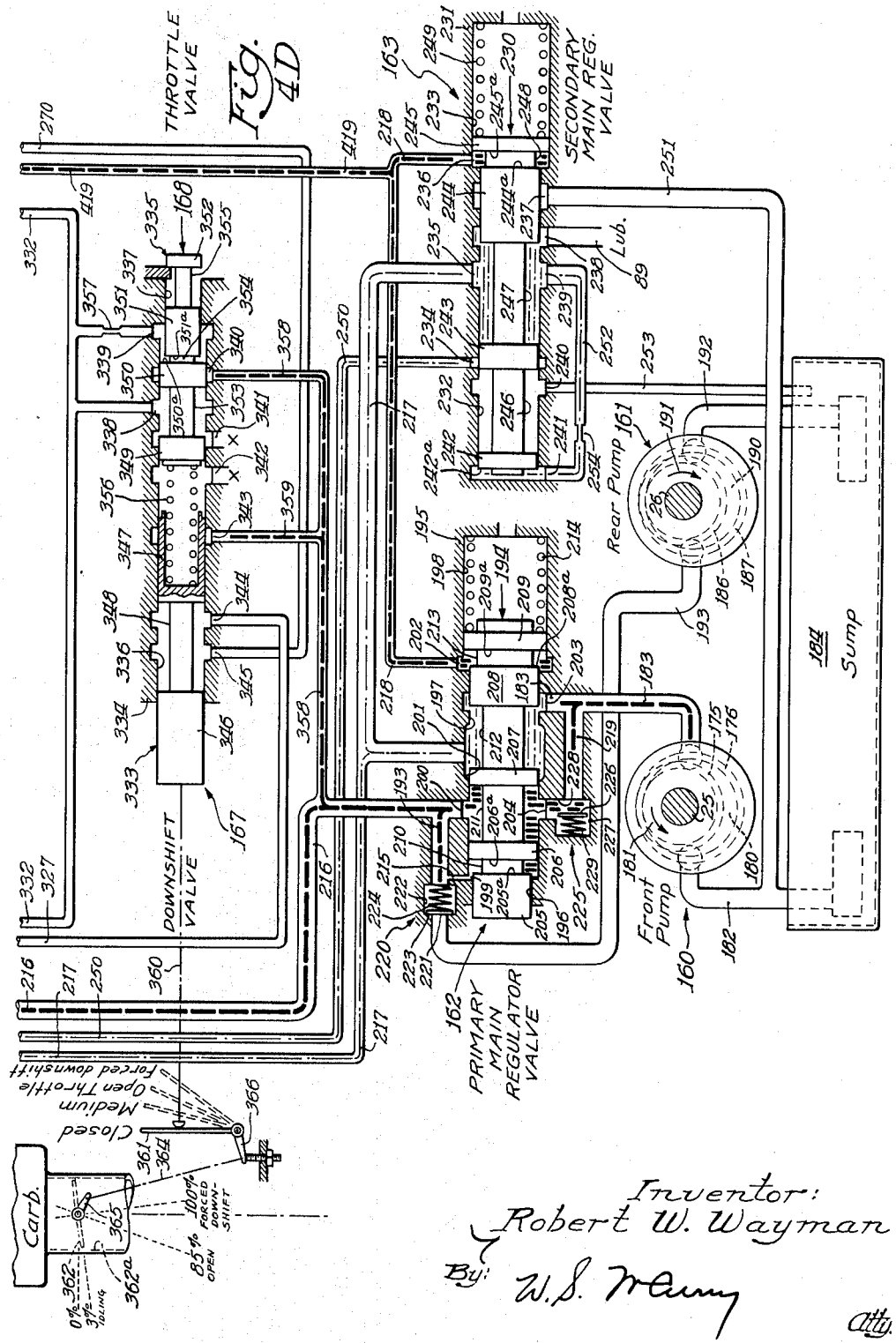

Jan. 4, 1966 — R. W. WAYMAN — 3,226,927
CONTROLS FOR POWER TRANSMISSION
Original Filed June 5, 1950 — 7 Sheets-Sheet 6

Inventor:
Robert W. Wayman

Jan. 4, 1966   R. W. WAYMAN   3,226,927
CONTROLS FOR POWER TRANSMISSION
Original Filed June 5, 1950   7 Sheets-Sheet 7

CONVERTER CHARGE PRESSURE CHARACTERISTIC IN HIGH RANGE.

CONVERTER CHARGE PRESSURE CHARACTERISTIC IN LOW RANGE.

Inventor:
Robert W. Wayman
By: W. S. McCurry
Atty.

United States Patent Office 3,226,927
Patented Jan. 4, 1966

3,226,927
CONTROLS FOR POWER TRANSMISSION
Robert W. Wayman, North Riverside, Ill., assignor to Borg-Warner Corporation, Chicago, Ill., a corporation of Illinois
Original application June 5, 1950, Ser. No. 166,136, now Patent No. 3,165,946, dated Jan. 19, 1965. Divided and this application June 10, 1964, Ser. No. 387,251
8 Claims. (Cl. 60—12)

This application is a division of my previous application Serial No. 166,136 filed June 5, 1950, and now Patent No. 3,165,946.

My invention relates to transmission for automotive vehicles and more particularly to hydraulic controls for such transmissions.

It is an object of the invention to provide improved transmission controls which include friction engaging devices, such as friction clutches and brakes, for completing a reverse power train and low, intermediate and high forward drive power trains through the transmission and mechanism for so actuating the friction engaging devices that the drive through the transmission may be automatically changed between the intermediate and high speed forward drives, and the low speed forward drive and the reverse drive may be obtainable selectively at the will of the operator. It is contemplated that the transmission shall preferably include a planetary gear set on which these friction engaging devices are effective in order to have its drive changed as aforesaid between three forward drives and reverse drive and a hydraulic torque converter in series with the gear set, so that the torque between the drive and driven shafts of the transmission is the product of the torque multiplications by the torque converter and the planetary gear set.

It is another object of the invention to vary the charging pressure of the hydraulic torque converter in the transmission with operating conditions of the transmission and more particularly with the torque being transmitted through the torque converter and the speed of parts of the torque converter. It has been found that the required charging pressure of a torque converter varies with the latter two conditions, and in order that unnecessary pumping losses may be avoided, the pressure in the torque converter is lowered in accordance with the technings of my invention with decreases in the torque transmitted through the converter and also with increases in the speed of the parts of the converter. More particularly it is an object of the invention to provide regulating valve means for increasing the fluid pressure in the torque converter when the engine throttle of the vehicle is opened and decreasing the pressure in the converter when the throttle is closed. It is also an object to provide regulating valve means for decreasing the fluid pressure in the torque converter on increases in speed of the driven shaft of the transmission, for example, which varies generally with speeds of the parts of the torque converter.

It is another object of the invention to provide improved hydraulic control mechanism for providing the variable fluid pressure for the power train friction engaging devices and for the torque converter that increase with greater engine throttle openings and decrease with increases in speed of the transmission driven shaft and which hydraulic mechanism preferably includes valve mechanism under the control of the vehicle engine throttle control providing a throttle pressure that increases with throttle opening, governor valve mechanism that provides a governor pressure that increases with speed of the driven shaft, which pressures act on a first regulating valve tending to move the regulating valve in opposite directions. It is contemplated that the friction engaging devices shall be subject to a pressure produced by a second regulating valve and the torque converter shall be subject to a pressure produced by a third regulating valve, with the first regulating valve producing a fluid pressure that is impressed on both the second and third regulating valves and increases with the speed of the driven shaft and decreases with increased throttle openings, this pressure imposed on the second and third valves thus varying just oppositely with respect to the pressures on the torque converter and on the friction engaging devices.

It is another object of the invention to provide a pump driven by the drive shaft of the transmission and a pump driven by the driven shaft of the transmission which constitute a source of fluid pressure and to provide an improved fluid pressure regulating mechanism for use in connection with the pumps and fluid pressure actuated drive completing clutches and brakes and with the hydraulic torque converter, so that the drive shaft pump may be utilized for both the clutches and brakes and for the torque converter for low speeds of the vehicle and the driven shaft pump when in operation may be utilized for providing the pressure for the clutches and brakes while the drive shaft pump may be utilized under these conditions for providing only the pressure for the hydraulic torque converter. The torque converter pressure is preferably lower than the pressure for the clutches and brakes and when this change takes place, the power required for driving the drive shaft pump is thereby reduced.

The invention consists of the novel constructions, arrangements and devices to be hereinafter described and claimed for carrying out the above-stated objects and such other objects as will appear from the following description of a preferred form of the invention, illustrated with reference to the accompanying drawings, wherein:

FIG. 1 is a diagram showing the manner in which FIGS. 2A and 2B constituting parts of FIG. 2 may be placed together in order to form the complete FIG. 2;

FIG. 2 is a longitudinal, sectional view of a transmission with which my improved hydraulic transmission controls may be used and comprising the parts shown in FIGS. 2A and 2B, which may be placed together in the manner illustrated in FIG. 1;

FIGURE 3 is a sectional view taken on lines 3—3 of FIGURE 2a;

FIGURE 7 is a legend illustrating the various hydraulic pressures which are shown in FIGURES 4A–4D inclusive.

Like characters of reference designate like parts in the several views.

Figure 4C:
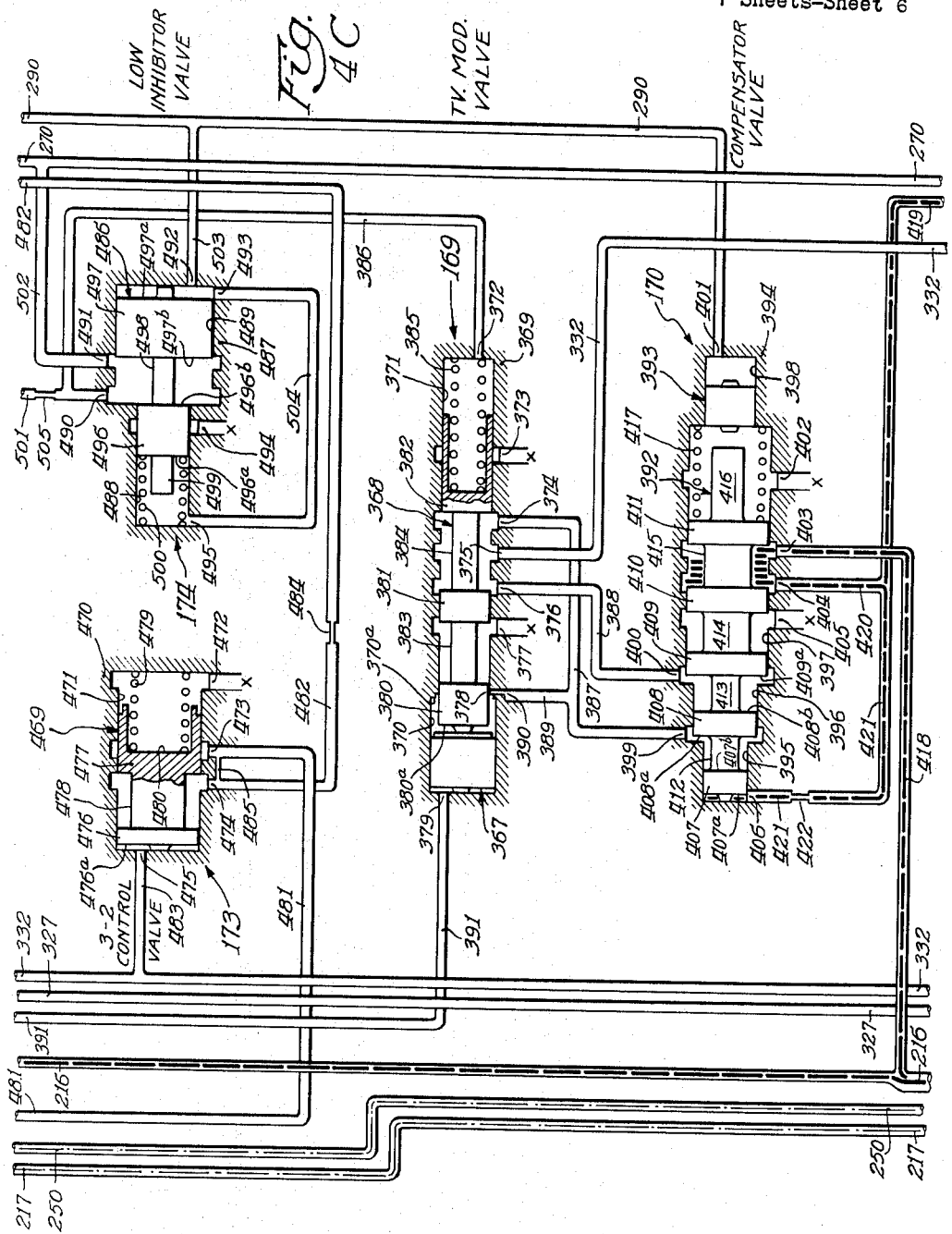
FIGURE 4 is a diagrammatic illustration of the transmission and the associated hydraulic control system embodying the principles of the invention and comprising the parts shown in FIGURES 4a, 4b, 4c and 4d with the transmission control system being illustrated in the neutral condition.

The present invention constitutes an improvement on the hydraulic transmission controls shown in a copending patent application by Herdis George English, Serial No. 68,342, filed December 30, 1948, now abandoned, and is applicable to transmissions of the type shown in the copending applications of Herdis George English, Sidney V. Hettinger, Jr., and Robert W. Wayman, Serial No. 72,902, filed January 26, 1949, now abandoned;

Harold T. Youngren, Herdis George English and Sidney V. Hettinger, Jr., Serial No. 74,045, filed February 2, 1949, now abandoned; and Harold T. Youngren, Herdis George English and Sidney V. Hettinger, Jr., Serial No. 25,064, filed May 4, 1948, now Patent No. 2,699,076.

Referring now in particular to FIGS. 1, 2 and 4 of the drawings, the transmission may be seen to comprise a drive shaft 25, a driven shaft 26 and intermediate shafts 27 and 28. The shaft 25 may be the usual crankshaft of the vehicle engine, and the shaft 26 may be connected by any suitable means (not shown) with the driving road wheels of the vehicle. All of the shafts 25, 26, 27 and 28 are rotatably disposed with respect to the transmission housing 29 and the shafts 27 and 28 are in effect piloted with respect to the shafts 25 and 26. The transmission comprises in general, a hydraulic torque converter 30, hydraulically operated friction clutches 31 and 32, hydraulically operated friction brakes 33 and 34 and a planetary gear set 35.

The hydraulic torque converter 30 comprises a vaned impeller element 36, a vaned rotor or driven element 37 and a vaned stator or reaction element 38. The vaned elements 36, 37 and 38 are disposed within a fluid tight casing 39, a part of which is formed by the casing 40 of the impeller 36. The impeller 36 is driven from the drive shaft 25 through a thin flexible annular metal ring 41 fixed to both the drive shaft 25 and casing 40. The rotor 37 is fixed to the intermediate shaft 27. The stator 38 is rotatably disposed on a stationary sleeve 42 which is fixed to the transmission casing 29, and a one-way brake 43 is disposed between the stator and the sleeve 42.

The one-way brake 43 may be of any suitable construction and in the illustrated embodiment comprises a plurality of tiltable sprags 44 disposed between an inner race 45 and an outer race 46. The inner race 45 is fixed with respect to the sleeve 42, and the outer race 46 is fixed with respect to the stator 38. The brake 43 comprises a sprag cage 47 and a sprag retainer spring 48 passing through the sprags. Two radially perforated thrust washers 49 and 50 are provided on opposite sides of the sprag brake 43 for holding the brake 43 in its proper place and for holding the stator spaced from the runner and impeller. The one-way brake 43 is so arranged as to allow a free rotation of the stator 38 in the forward direction, that is in the same direction in which the drive shaft 25 rotates and which is indicated by the arrow 51 and prevents a rotation of the stator in the reverse direction. In the latter case, the sprags 44 engage the inner and outer races 45 and 46, being tilted into engaging relation with the races by means of the spring 48, and in the former case, the outer race 46 rotates in a direction to slightly rotate the sprags 44 against the action of the spring 48 to disengage them with respect to the inner and outer races.

The torque converter 30 functions in a manner well known for such torque converters for driving the rotor or driven element 37 at an increased torque with respect to the torque impressed on the impeller 36 of the converter. The vanes of the stator 38 function to change the direction of flow of fluid between the rotor and impeller, the flow of fluid being indicated by the arrow 52, so as to provide this increased torque on the driven element 37. In this case the reaction on the stator 38 is in the direction reverse to the rotation of the drive shaft 25, so that the one-way brake 43 engages and prevents rotation of the stator in this direction. When the speed of the driven element or rotor 37 reaches a predetermined value, the reaction on the vanes of the stator 38 changes in direction, tending to rotate the stator in the forward direction, and the brake 43 releases and allows such rotation of the stator. In this case, the torque converter 30 functions as a simple fluid coupling to drive the rotor 37 at substantially the same speed and with no increase in torque with respect to the impeller 36.

As is well known, heat is developed in the fluid in a torque converter of this type, and cooling fins 53 are provided on the exterior of the impeller casing 40 for providing increased cooling for the casing 40 and the fluid within the converter. A shroud 54 is provided within the transmission casing 29 in the vicinity of the fins 53 for guiding a flow of air through the fins.

The planetary gear set 35 comprises a sun gear 55 which is formed on the shaft 28, a second sun gear 56 formed on a sleeve portion 57 which is rotatable on the shaft 28, a ring gear 58 formed on a bell shaped portion 59 of the driven shaft 26, a plurality of planet gears 60 each having a gear portion 60a and a gear portion 60b, a plurality of planet gears 61 and a planet gear carrier 62. Each planet gear 60 is rotatably disposed in the planet gear carrier 62 by means of a shaft 63, and each of the planet gears 61 is rotatably disposed in the carrier 62 by means of a shaft 64. The gear carrier 62 is rotatably disposed within the transmission casing 29 and with respect to the shaft 28 and shaft portion 57 by any suitable bearings. The planet gears 61 are each in mesh with the sun gear 55 and also with the gear portion 60b of a planet gear 60. The portions 60b of the gears 60 are also in mesh with the ring gear 58, and the gear portions 60a of the gears 60 are in mesh with the sun gear 56.

The clutch 31 is arranged to connect the shaft 27 driven by the rotor 37 with the shaft 28 and the sun gear 55 formed thereon. The clutch 31 comprises clutch discs 65 splined on to a hub member 66 which in turn is splined on the shaft 28. The clutch also comprises clutch discs 67 interleaved between the discs 65 and splined within a member 68 rotatably disposed on the shaft 28. The part 68 is splined on an enlarged portion 69 of the shaft 27 so as to be driven by this shaft.

The clutch 31 comprises a movable pressure plate 70 splined within the member 68 and adapted to press the friction discs 65 and 67 together in frictional engagement and between it and the enlarged portion 69 which acts as a pressure member on the other side of the discs. An annular piston 71 is provided for actuating the movable pressure plate 70 and is slidably disposed within an annular cavity 72 provided in the part 68. Pressure from the piston 71 is transmitted to the pressure plate 70 through a spring strut 73 which is in the form of a ring and is held in place within the part 68 at its outer edge by means of a retainer 74. The strut 73 at its inner periphery is acted on by the piston 71, so that its inner periphery moves axially with respect to its outer periphery and moves the pressure plate 70 which is acted on by the strut 73 at intermediate points thereof. The ring 73 is in its relaxed condition as it is illustrated in FIG. 2 and is distorted out of shape as just described by the piston 71 on movement thereof, and this distortion is against the spring action of the ring 73. The resilient action of the ring 73 functions to return the piston back into its illustrated position when fluid pressure, applied as will be hereinafter described, is released from the piston.

The clutch 32 is arranged to connect the part 68 and thereby the shaft 27 with the shaft portion 57 and sun gear 56 and comprises clutch discs 75 splined on to the member 68 and clutch discs 76 splined within a member 77 which is fixed to the shaft portion 57. A pressure plate 78 is fixed within the member 77 on one side of the clutch discs, and an annular hydraulic piston 79 is provided on the other side of the discs and within a similarly shaped cavity 80 formed in the part 77 for compressing the discs between it and the pressure plate 78. A coiled return spring 81 is provided for yieldably holding the piston 79 in its illustrated clutch releasing position. The spring 81 is disposed between the piston 79 and a spring retainer collar 82 fixed on the shaft portion 57.

Fluid under pressure is supplied to the piston 71 by a passage 83 which extends through the shaft 28 and associated part 68, through the gear set 35 and through the shaft 26. A sleeve 84 surrounding the shaft 26 seals the passage 83 from various other passages to be described. The passage 83 in the shaft 28 is formed by a tube 85 extending through the shaft 28, as shown. A passage 86 is provided for supplying fluid under pressure to the piston 79, and this passage extends through the shaft 28 and is formed by a tube 87 surrounding the tube 85. The passage 86 extends into the shaft 26 and within the sleeve 84. The tubes 85 and 87 are disposed in a cylindrical cavity 88 in the shaft 28, and the sides of this cavity form, with the tube 87, part of a conduit 89 for lubricating fluid which may pass through various connected passages with various working parts of the transmission, such as with the gear 55.

The brake 33 comprises a brake band 90 adapted to be contracted on a drum portion 91 of the part 77 for thereby braking the sun gear 56. As illustrated in FIGURE 4 a servomotor 103 is provided for actuating brake 33 and includes a brake apply chamber 102 and a brake release chamber 101.

The brake 34 comprises a brake band 104 adapted to be contracted on a drum portion 105 of the planetary gear carrier 62. As illustrated in FIGURE 4 a servomotor 116 is provided to actuate the brake 34.

A parking brake generally indicated as 117 may be provided for use with the transmission. The selector lever 138 is connected with a lever 140, so that the levers 138 and 140 rotate together, and the lever 140 is connected to parking brake 117 by suitable linkage generally indicated by numeral 142.

The illustration of the steering wheel 139 in FIG. 4B is a top view, and the wheel is located immediately in front of the seat 150 for the driver of the vehicle, as shown, so that the lever 138 is moved away from the driver into its "P" position, which is indicated, for purposes hereinafter to be described.

In operation, the transmission has a neutral condition and provides low, intermediate and high speed ratios in forward drive and a drive in reverse. As illustrated in FIG. 2, the transmission is in neutral condition in which the clutches 31 and 32 and the brakes 33 and 34 are disengaged. For ordinary driving conditions of the vehicle, the transmission is operated in its high range which includes the intermediate and high speed ratios.

For a complete discussion of how the various ratios are completed by actuation of the various friction elements reference may be had to the above-mentioned U.S. Patent No. 3,165,946.

Referring now to FIGS. 4a through 4d inclusive, the hydraulic control system for the transmission comprises in general a front pump 160 and a rear pump 161 which, together provide a source of hydraulic pressure; a primary main regulator valve 162 for regulating the fluid pressure from the pumps and applied to the pistons for the various friction brakes and clutches of the transmission; a secondary main regulator valve 163 for regulating the fluid pressure from the pumps applied to the torque converter 30; a manually operated selector valve 164 for conditioning the transmission for operation in different forward speed ratios and in reverse and having an "H" or High Range position, an "L" or Low Range position, an "N" or Neutral position, and "R" or Reverse position, and a "P" or Parking position; a governor valve 165; an automatic 2–3 valve 166 for changing the drive through the transmission from its second forward speed ratio to its third forward speed ratio; a downshift valve 167 for causing actuation of the 2–3 valve under manual control for changing the drive through the transmission from its third to its second speed ratio when the operator of the vehicle so desires; a throttle valve 168 for providing a throttle pressure that increases with the depression of the vehicle accelerator; a TV modulator valve 169 for supplying the throttle pressure from the valve 168 to various lands of a compensator valve 170 for different conditions of operation of the transmission, the compensator valve 170 providing a fluid pressure that varies inversely with the depression of the vehicle accelerator to the regulator valves 162 and 163 so that they regulate correctly; a low regulator valve 171 which functions on a shift of the manual valve 164 from high range to low range position with a closed vehicle engine throttle to regulate the hydraulic pressure to apply the rear brake 34 with less than the pressure that is supplied by the primary main regulator valve 162 for thereby providing a smooth change in speed ratio under these circumstances; a 1–2 valve 172 which functions on a change between ranges to cause simultaneous engaging and disengaging fluid pressure flows to the motors for the front brake 33 and rear brake 34 when the proper pressure values are reached; a 3–2 control valve 173 which functions to provide a restriction in a fluid discharge conduit for the motor for the front brake 33 on a governor controlled change from third speed to second speed ratio; and a low inhibitor valve 174 which functions under the influence of the governor valve 165 above a certain speed of the vehicle to provide a speed ratio change from third speed ratio to second speed ratio rather than to first speed ratio when the manual valve 164 is moved from its high range position to its low range position. These various hydraulic elements and mechanisms, including their construction and operation, will now be described in greater detail.

The pump 160 may be of any suitable construction, and in the illustrated embodiment of the controls comprises an inner gear 175 in mesh with an eccentrically disposed outer gear 176. The inner gear 175 is connected to be driven by the shaft 25 through the impeller casing 40 by means of a sleeve shaft 177 fixed to the impeller casing, and the gear 175 may have a toothed connection 178 with the sleeve 177. The gears 175 and 176 are disposed in a pump casing 179 fixed with respect to the transmission casing 29, and the casing 179 comprises a crescent shaped portion 180 disposed between the gear 175 and 176, as shown. The inner gear 175 is driven from the drive shaft 25 in the direction indicated by the arrow 181, which is in the counterclockwise direction as seen in FIG. 4d, so that the gear 176 rotates in this direction also, and the pump 160 is thus effective to pump from an inlet conduit 182 to a discharge conduit 183. The conduit 182 is arranged to draw fluid out of a transmission sump 184 formed by an oil pan 185 fixed to the bottom of the transmission.

The rear pump 161 is similar in construction to the front pump 160 and comprises an inner gear 186 in mesh with an eccentrically disposed ring gear 187. The gear 186 is fixed on the driven shaft 26 of the transmission by any suitable means, such as a key 188. The gears 186 and 187 are rotatably disposed in a pump casing 189 fixed with respect to the transmission casing 29 and which comprises a crescent shaped portion 190 disposed between the gears, as shown. The gear 186 is driven in a clockwise direction, as indicated by the arrow 191, in FIG. 4d, when the driven shaft 26 rotates in the same direction as the drive shaft 25 for providing a forward drive of the vehicle, and in this case, the pump is adapted to draw fluid through an inlet conduit 192 and discharge it into an outlet conduit 193. The inlet conduit 192, like the conduit 182, is arranged to draw fluid from the transmission sump 184.

The primary main regulator valve 162 comprises a piston 194 slidably disposed in a casing portion 195. The casing portion 195 is formed with cylindrical cavities 196, 197 and 198 of successively increasing diameter, and the piston 194 is slidably disposed within these cavities. The cylindrical cavities have ports 199, 200, 201, 202, 203 and 204 connected therewith, as shown. The piston 194 comprises lands 205, 206, 207, 208 and 209, and grooves 210, 211, 212 and 213 between the lands. The piston 194 is disposed within the casing portion 195 so that its land 205 is in sliding contact with the walls of the cavity 196; its lands 206, 207 and 208 are in sliding contact with the walls of the cavity 197 and the land 209 is in sliding contact with the walls of the cavity 198. A spring 214 is disposed between the land 209 and the adjacent end of the cavity 198, as shown.

The port 199 is connected by means of a small passage 215 with the conduit 193. The port 200 is connected with a conduit 216 that serves as a source of regulated fluid pressure to be applied to the pistons for the brakes and clutches, as will hereinafter be described, and the conduit 193 is connected with the conduit 216 as shown. The port 201 is connected with a conduit 217, and the port 202 is connected with a conduit 218. The port 203 is connected with the conduit 183, and the port 204 is also connected with this latter conduit by means of a conduit 219.

A one-way check valve 220 is disposed in the conduit 193 and in its illustrated form comprises a valve element 221 movably disposed in an enlarged cylindrical cavity 222 and adapted to seat on one end 223 of the cavity for closing the conduit 193. A spring 224 is disposed between the other end of the cavity and the valve element 221 for yieldably holding the valve element against the seat 223 for closing the conduit 193.

A similar one-way check valve 225 is provided in the conduit 219 and comprises a valve element 226 movably disposed in an enlarged cylindrical cavity 227 and adapted to seat on one end 228 of the cavity. A spring 229 is provided for yieldably holding the valve element 226 on the end 228 of the cylindrical cavity 227.

The secondary main regulator valve 163 comprises a piston 230 slidably disposed in a casing portion 231. The casing portion is provided with cylindrical cavities 232 and 233 which are coaxially disposed and in communication with each other, and the piston 230 is slidably disposed in these cavities. The cavity 233 is larger in diameter than the cavity 232, as shown. The cavities 232 and 233 are provided with ports 234, 235, 236, 237, 238, 239, 240 and 241. The piston 230 is provided with lands 242, 243, 244 and 245 and grooves 246, 247 and 248 between the lands. A spring 249 is provided between the land 245 and the adjacent end of the cavity 233. The lands 242, 243 and 244 are slidably disposed in the cavity 232 and the land 245 is slidably disposed in the cavity 233.

The port 234 is connected with a conduit 250; the port 235 is connected with the conduit 217; the port 236 is connected with the conduit 218; the port 237 is connected with a conduit 251; the port 238 is connected with the conduit 89; the ports 239 and 241 are connected together by means of a conduit 252; and the port 240 is connected to a conduit 253.

The conduits 217 and 250 are both connected with the torque converter 30 as shown. The conduit 217 constitutes a fluid supply conduit for the converter and passes between the sleeves 177 and 42 and through the perforated washer 50 into the converter. The conduit 250 constitutes an exhaust conduit for the converter and passes between the shafts 27 and 42 and through the washer 49 on the left side of the one-way brake 43 (see FIG. 2). The conduit 251 is connected with the intake conduit 182 for the pump 160, as shown, and constitutes an exhaust conduit for the valve 163. The conduit 89 is a lubrication conduit, as has already been described, and passes through the shaft 28. The conduit 252 connecting the ports 239 and 241 is for the purpose of providing a regulating action for the valve 163, as will be described, and is formed with a constriction 254 for purposes to be described. The conduit 253 is at times connected by means of the valve 163 with the conduit 250 and discharges into the sump 184.

The manual selector valve 164 comprises a piston 255 disposed in a casing portion 256. The casing portion 256 is provided with a cylindrical cavity 257 in which the piston is slidable, and the cavity has a plurality of ports 258, 259, 260, 261, 262 and 263 in communication therewith. The piston 255 has lands 264, 265 and 266 and grooves 267 and 268 separating the lands.

The port 263 is connected with a conduit 269; the port 262 is connected with the conduit 83 which, as has been previously described, is connected to apply fluid pressure to the piston 71 for engaging the front clutch 31; the port 261 is connected with the fluid supply conduit 216; the port 260 is connected with a conduit 270; the port 259 is connected with a conduit 271; and the port 258 constitutes a bleed port through which fluid may freely discharge into the sump 184. The conduits 83 is provided with a restriction 272 therein for purposes which will be described.

The selector valve piston 255 is connected to be controlled by the selector lever 138 for moving the piston between its various positions. The connection between the selector lever 138 and the valve piston 255 may comprise a lever 273 fixed with respect to the lever 138 and rotatable therewith and connected as by means of a link 274 with the piston 255. As has been described, the lever 138 has the following positions: "P" or parking, "R" or reverse, "N" or neutral, "H" or high range, and "L" or low range; and the selector valve piston 255 has corresponding positions, as indicated.

The governor valve 165 constitutes a hydraulic governor and comprises a piston 275 movably disposed in a casing 276 which is disposed on the driven shaft 26 and is fixed to rotate with the shaft by any suitable means, such as a ball 277 disposed in a splineway formed in the casing 276. The casing 276 is provided with two connected cavities 278 and 279 therein for receiving the piston 275 which are respectively of smaller and larger diameter. The cavities are provided with ports 280, 281, 282 and 283. The piston 275 is provided with lands 284, 285 and 286, the lands 284 and 285 being slidably disposed in the cavity 278 and the land 286 being slidably disposed in the cavity 279. Grooves 287 and 288 separate the lands as shown. The port 280 is connected with a conduit 289 which in turn in connected with the conduit 83; the ports 281 and 282 are connected with a conduit 290 and the port 283 is connected with a passage 291 through which fluid may freely discharge into the sump 184.

The 2–3 valve 166 comprises pistons 292, 293 and 294 slidably disposed in a casing portion 295. The casing portion 295 has connected cavities 296, 297, 298, 299, 300 and 301 of the relative diameters illustrated for receiving the pistons. The cavities in the casing portion 295 are provided with ports 302, 303, 304, 305, 306, 307, 308, 309, 310, 311 and 312. The piston 292 comprises a land 313 and reduced end portions 314 and 315. The piston 293 comprises lands 316, 317 and 318 and grooves 319 and 320 between the lands and a reduced end portion 321. The piston 294 comprises lands 322 and 323 and a groove 324 separating the lands. A spring 325 is provided between the land 316 and the opposite end of the cavity 297, and a spring 326 is provided between the land 316 and the land 313 on the piston 292. As shown, the lands 313, 316, 317, 318, 322 and 323 are disposed in the cavities 296, 297, 298, 299, 300 and 301, respectively, and have a sliding fit with the respective cavities.

The port 302 is connected with a conduit 327; the port 303 is connected with the conduit 269 which has a restriction 328 formed therein as shown; the port 304 is connected with the conduit 86; the port 305 is connected with the conduit 271; the port 306 is a bleed port through which fluid may freely discharge into the sump 184; the port 307 is connected with the conduit 290 by means of a branch conduit 329; the port 308 is connected with a conduit 330; the port 309 is connected with the conduit 290 through the branch conduit 329; the port 310 is connected with the conduit 330 through a passage 331; the port 311 is connected with the conduit 330; and the port 312 is connected with a conduit 332.

The downshift valve 167 comprises a piston 333 disposed in a casing portion 334, and the throttle valve 168 comprises a piston 335 also disposed in the casing portion 334. The casing portion 334 is provided with connected cylindrical cavities 336 and 337 of respectively larger and smaller diameters as shown, and the pistons 333 and 335 are slidably disposed in these cavities as shown. The cavities 336 and 337 are provided with ports 338, 339, 340, 341, 342, 343, 344, and 345. The downshift valve piston 333 is provided with lands 346 and 347 and with a groove 348 separating the lands. The piston 335 is provided with lands 349, 350, 351 and 352 and grooves 353, 354 and 355 separating the lands. The lands 346 and 347 of the piston 333 and the lands 349 and 350 of the piston 335 are slidably disposed in the cavity 336, and the land 351 of the piston 335 is slidably disposed in the smaller sized cavity 337, as shown. A spring 356 is disposed between the pistons 333 and 335 and extends into an internal end cavity in the piston 333, as shown.

The port 338 is connected with the conduit 332 for providing a regulated throttle pressure to the conduit 332 as will be hereinafter described; the port 339 is connected by means of a restriction 357 with the conduit 332; the port 340 is connected with a conduit 358 which in turn is connected with the fluid supply conduit 216; the ports 341 and 342 are fluid bleed ports adapted to freely discharge into the sump 184; the port 343 is connected by means of a branch conduit 359 with the conduit 358 and through the latter with the fluid supply conduit 216; the port 344 is connected with the conduit 327; and the port 345 is connected with the conduit 270.

The downshift valve piston 333 is connected by any suitable linkage such as the link 360 with the vehicle accelerator 361. The accelerator 361 has an ordinary connection with the carburetor butterfly valve 362 for the internal combustion vehicle driving engine 363 which may include a link 364 connecting the carburetor throttle lever 365 and a lever 366 fixed to move with the accelerator 361.

The TV modulator valve 169 comprises pistons 367 and 368 disposed in a casing portion 369. The casing portion is provided with connected cavities 370 and 371 therein of relatively large and small diameters respectively. The cavities are provided with ports 372, 373, 374, 375, 376, 377, 378 and 379. The piston 368 is provided with lands 380, 381 and 382 and grooves 383 and 384 between the lands. The piston 367 is slidably disposed in the cavity 370, and the piston 368 is slidably disposed in the cavity 371, as shown. A spring 385 is disposed between the right end of the piston 368 and the adjacent end of the cavity 371, as shown.

The port 372 is connected with a conduit 386; the port 373 is a bleed port from which fluid may freely discharge into the sump 184; the port 374 is connected to a conduit 387; the port 375 is connected with the conduit 332; the port 376 is connected with a conduit 388; the port 377 is a bleed port similar to the port 373 through which fluid may freely discharge into the sump 184; the port 378 is connected by a passage 389 having a restriction 390 therein with the conduit 387; and the port 379 is connected with a conduit 391.

The compensator valve 170 comprises pistons 392 and 393 in a casing portion 394. The casing portion 394 has connected cylindrical cavities 395, 396, 397 and 398 therein. These cavities are provided with ports 399, 400, 401, 402, 403, 404, 405 and 406. The piston 392 is provided with lands 407, 408, 409, 410, 411 and grooves 412, 413, 414 and 415 between the lands and a reduced end portion 416. A spring 417 is disposed between the land 411 and the adjacent end of the cavity 397. The lands 409, 410 and 411 are slidably disposed in the cavity 397 and the lands 407 and 408 are slidably disposed in the cavities 395 and 396, respectively. The piston 393 is slidably disposed in the cavity 398.

The port 399 is connected with the conduit 387; the port 400 is connected with the conduit 388; the port 401 is connected with the conduit 290; the port 402 is a bleed port adapted to discharge fluid into the sump 184; the port 403 is connected to the fluid supply conduit 216 by means of a branch conduit 418; the port 404 is connected with a conduit 419 by means of a branch conduit 420, and, as shown, the conduit 419 in turn is connected with the conduit 218; the port 405 is a bleed port for discharging fluid into the sump 184; and the port 406 is connected with the conduit 419 by means of a branch conduit 421 having a restriction 422 therein.

The low regulator valve 171 comprises pistons 423 and 424 disposed in a casing portion 425. The pistons 423 and 424 are slidably disposed in connected cylindrical cavities 426, 427 and 428 in the casing portion. As shown, the cavity 428 is somewhat smaller than the cavity 426, and the cavity 426 is smaller in diameter than the cavity 427. The cavities have ports 429, 430, 431, 432, 433, 434 and 435. The piston 423 comprises a land 436 and reduced end portions 437 and 438, and the piston 424 comprises lands 439, 440 and 441 and grooves 442 and 443 and a reduced end portion 444. As shown, the land 436 is slidably disposed in the cavity 426; the land 439 is slidably disposed in the cavity 427; and the lands 440 and 441 are slidably disposed in the cavity 428.

The port 429 is connected with a conduit 445 having a restriction 446 therein; the port 430 is connected with the conduit 271 by means of a branch conduit 447; the port 431 is connected with the conduit 447 by means of a branch conduit 448; the port 432 is connected with the conduit 445; the port 433 is connected with a conduit 449; the port 434 is connected with a conduit 450 which in turn is connected to apply fluid pressure to the piston 113 for the brake 34; and the port 435 is connected to the conduit 332 by means of a branch conduit 451.

The 1–2 valve 172 comprises a piston 452 disposed in a casing portion 453. The casing portion has connected cylindrical cavities 454 and 455, which are respectively of relatively small and large diameter, for receiving the piston 452. The cavities have ports 456, 457, 458, 459 and 460. The piston 452 has lands 461, 462 and 463 and grooves 464 and 465 between the lands and a reduced end portion 466. As shown, the lands 461 and 462 fit in the cavity 454, and the land 463 fits in the cavity 455.

The port 456 is connected with a conduit 467 which is arranged to apply fluid pressure to the chamber 102 of the servomotor 103; the ports 457 and 458 are bleed ports adapted to discharge fluid into the sump 184; the port 459 is connected to the conduit 449; and the port 460 is connected to a conduit 468 which in turn is connected with the conduit 83.

The 3–2 control valve 173 comprises a piston 469 disposed in a casing portion 470, and the casing portion is provided with a cylindrical cavity 471 for receiving the piston. The cavity is provided with ports 472, 473, 474 and 475, as shown. The piston 469 is provided with lands 476 and 477 having a sliding fit in the cavity 471 and spaced by a groove 478. A spring 479 is disposed in a cavity 480 formed in the piston 469 and extends between the end of the cavity and the adjacent end of the cavity 471.

The port 472 is a bleed port adapted to discharge fluid freely into the sump 184; the port 473 is connected with a conduit 481 which is connected with the chamber 101 in the servomotor 103 for the brake 33; the port 474 is connected with a conduit 482 which in turn is connected with the conduit 86; and the port 475 is connected with the conduit 332 by means of a branch conduit 483. A restriction 484 is provided in the conduit 482, and a passage 485 of relatively small diameter is provided between the conduits 481 and 482, as shown.

The low inhibitor valve 174 comprises a piston 486 disposed in a casing portion 487. The casing portion 487 has connected cylindrical cavities 488 and 489 of relatively small and large diameters respectively formed therein, and the cavities have ports 490, 491, 492, 493, 494 and 495. The piston 486 is formed with lands 496 and 497 and a groove 498 therebetween and a reduced end portion 499. A spring 500 is disposed between the lands 496 and the adjacent end of the cavity 488, as shown. The land 496 has a sliding fit in the cavity 488 and the land 497 has a sliding fit in the cavity 489.

The port 490 is connected by means of a conduit 501 with the conduit 499 and the conduit 386; the port 491 is connected with the conduit 270 by means of a branch conduit 502; the port 492 is connected by means of a branch conduit 503 with the conduit 299; the port 493 is connected to a conduit 504; the port 494 constitutes a bleed port through which fluid may freely discharge into the sump 184; and the port 495 is connected to the conduit 504. A restriction 505 is provided in the conduit 501 between its junctions with the conduits 386 and 449, as shown.

In operation, the transmission and its hydraulic control system are under the control of the vehicle operator by means of the accelerator 361 of the vehicle and the manual selector lever 138. The manual selector lever 138, as has been described, has five different positions which are indicated in FIG. 4b and are respectively the "P," parking position; the "R," reverse position; the "N," neutral position; the "H," high range position; and the "L," low range position. The selector valve piston 255 is connected with the selector lever 138 by means of the link 274 and lever 273 so that the piston 255 has positions corresponding to those of the selector lever 138, and these positions are also indicated in these figures. The transmission is conditioned for various types of operation by moving the selector lever 138 and the manual selector valve piston 255 connected therewith into the positions corresponding to the type of operation desired.

The transmission is maintained in its neutral condition by having the manual selector lever 138 and the selector valve piston 255 in their neutral positions in which they are shown in FIG. 4b. In this condition of the transmission and its hydraulic controls, the accelerator 361 is assumed to be in its closed throttle position; although movement of the accelerator toward its open throttle position, when the manual selector valve piston 255 is in this position, has no effect on the condition of the transmission to complete a drive through it. This position of the accelerator as well as its medium throttle, open throttle and forced downshift positions, are indicated in FIG. 4d. The engine 363 is started with the selector lever 138 and valve 255 in their neutral positions, and prior to such operation of the engine, no fluid pressure exists in the hydraulic system since neither of the pumps 160 or 161 is in operation. The pump 160, it will be recalled, is driven from the transmission drive shaft 25 and thereby from the vehicle engine 363, and the pump 161 is driven by the driven shaft 26 of the transmission and thereby in accordance with the speed of the vehicle.

When the engine 363 begins operating, the pump 160 driven by the engine supplies line pressure to the conduit 183 and connected conduits.

In the neutral condition of the transmission and hydraulic system as illustrated in FIG. 4b, the pump 160 draws the transmission oil, which is the operating fluid of the transmission, from the sump 184 through the conduit 182 and discharges it into the conduit 183 as line pressure. The conduit 219 is connected with the conduit 183 and has line pressure therein, and the conduit 216 is connected with the conduit 219 through the check valve 225, the ports 204 and 200, and the groove 211 of the piston 194 for receiving line pressure. The valve element 226 is held off its seat 228 against the action of the spring 229 by the fluid pressure from the pump 160 to establish communication between the conduits 216 and 219, and the check valve 220 is closed with its valve element 221 disposed on the seat 223 by means of the line pressure which is effective on the check valve through the conduit 193 connected with the conduit 216. The check valve 220 prevents any flow of line pressure and any consequent leakage thereof through the conduit 193 and rear pump 161 which is inoperative in this condition of the transmission. The conduits 358, 359 and 418 are connected with the fluid supply conduit 216, and line pressure is also supplied to the latter conduits. The land 265 of the manual valve piston 255 in the neutral position of the piston blocks the port 261 and conduit 216, as shown. The port 340 and conduit 358 are blocked by the land 350 of the throttle valve piston 335, and the port 343 and conduit 359 are blocked by the land 347 of the downshift valve piston 333.

The primary main regulator valve 162 functions for all conditions of the transmission and its hydraulic control system to regulate the line pressure in the conduit 216 and connected conduits to predetermined maximum values. For this purpose the line pressure is supplied through the conduit 193 and through the passage 215 to the faces 205a and 206a of the lands 205 and 206. The face 206a is of greater area than the face 205a, since the land 205 is disposed in the smaller diameter cavity 196 as compared with the cavity 197, and the line pressure applied to these land faces tends to move the primary main regulator valve piston 194 to the right as seen in FIG. 4D against the action of the spring 214. This movement of the valve piston 194 tends to release the line pressure from the conduit 183 between an edge of the port 203 and an end of the land 208 into the groove 212 and into the converter supply conduit 217 through the port 201. The spring 214 is of such strength that the port 203 will not be thus opened by line pressure influence on the valve piston 194 until a certain line pressure is reached. Increased line pressure above this certain pressure tends to move the valve piston 194 farther to the right, as seen in FIG. 4D, so as to increase the opening between the land 208 and one edge of the port 203 and increase the flow from the conduit 183 through the groove 212 and port 201 for decreasing the line pressure in the conduit 183 and connected conduits to the predetermined maximum. The valve 194 thus functions to release excessive fluid under pressure discharged by the pump 160 and maintain the pressure in the conduit 183 and connected conduits at this predetermined pressure, assuming that there are no influences on the piston 194 other than the line pressure on the land faces 205a and 206a and the spring 214 tending to move the piston.

For most conditions of operation, however, including the condition illustrated in FIG. 4D, a third additional variable force is applied to the piston 194 tending to move it, and this third force is due to fluid pressures of different values supplied to the faces 208a and 209a of the lands 208 and 209 of the piston 194 through the port 202 and conduits 218, 419 and 420. For the neutral condition of the transmission with the accelerator 361 released and in its closed throttle position illustrated in FIG. 4D, full line pressure is applied to the land faces 208a and 209a, and the conduits 218 and 419 are connected by the valve piston 392 of the compensator valve 170 with the conduits 418 and 216 for this purpose. The line pressure in the conduit 418 flows through the port 403, the groove 415 of the piston 392 and the port 404 to the conduits 420, 419 and 218, as shown. This line pressure is applied to a face 407a of the land 407 of the piston 392 through the conduit 421 connected with the conduit 419; however, for this condition of operation as illustrated in FIG. 4C, the spring 417 acting on the piston 392 is of sufficient strength to hold the piston 392 to the limit of its movement toward the left as seen in the figure, and the fluid applied to this land face has no effect.

The fluid pressure applied to the faces 208a and 209a of the lands 208 and 209 of the main regulator valve piston 194 provides a force on the piston acting against the spring 214 tending to move the valve piston to the right as seen in the figure, since the lands 208 and 209 are slidably disposed in the cavities 197 and 198 which are respectively of relatively small and large diameters, and the line pressure in the conduit 183 and connected conduits is drained into the relief conduit 217 through the ports 203 and 201 at smaller line pressures than would otherwise be the case, and the full line pressure applied to the faces 208a and 209a as in this condition of the controls thus maintains the line pressure at a predetermined minimum, which for one certain embodiment of the invention is 75 lbs. per sq. in. The passage 215 is of a small restricted size so as to impede fluid flow therethrough and prevent quick longitudinal movements or vibrations of the piston 194 which would cause undesirable noise.

The conduit 217 which, as has been described, functions as a sump or fluid discharge conduit for the primary main regulator valve 162 is connected with the torque converter 30 to supply fluid pressure thereto. The secondary main regulator valve 163 is for the purpose of regulating the fluid pressure within the conduit 217 and thereby within the torque converter 30. The pressure in the conduit 217 is applied to the face 242a of the land 242 on the secondary main regulator valve piston 230 through the port 235, the groove 247, the port 239, the conduit 252 and the port 241, and as the fluid pressure in the conduit 217 and thereby in the converter 30 increases, it tends to move the piston 230 to the right as seen in the figure against the action of the spring 249 to open up the port 238 and lubrication conduit 89 to the port 235 and conduit 217 and meter fluid between the land 244 and an edge of the port 238 as is indicated by the illustrated position of the piston 230. Thus, as the fluid pressure in the conduit 217 and in the converter 30 tends to increase, the excessive fluid pressure is discharged into the conduit 89, and the pressure in the conduit 217 and converter 30 is kept to a predetermined maximum. The action of the valve piston 230 in regulating the pressure in the conduit 217 is similar to that of the valve piston 194 in regulating the pressure in the conduit 216. The restriction 254 in the conduit 252 is for the purpose of restricting the flow and inhibiting vibration of the valve piston 230 and is similar in its action to the restricted passage 215 for the valve piston 194.

As has been mentioned, the conduit 89 is a lubrication conduit, and referring to FIG. 2, fluid therein lubricates various contacting mechanical parts of the transmission. The gear set 35, is for example, lubricated through the passage 89a in the sun gear 55, and the clutch 32 having the dished friction plates 76 has lubricating fluid flowing through it and between its plates by means of the passages 89b, 89c and 89d. The clutch 32 is disengaged for all forward drives except high speed drive as has been described, and power is saved by lubricating the clutch in this manner.

The pressure within the conduits 419 and 218 is also applied to the valve piston 230 for changing the regulated converter pressures in conduit 217 for various conditions of operation of the transmission and controls. The fluid pressure in the conduit 218 is applied to the land faces 244a and 245a of the valve piston 230 through the port 236. The face 245a is of greater area than the face 244a, and this fluid pressure thus tends to move the valve piston 230 to the right against the action of the spring 249 and augment the action of the converter pressure applied to the face 242a of the land 242 to open the lubrication conduit 89 to the conduit 217 by moving the land 244 farther out of blocking position with respect to the port 238 and to thus further relieve the pressure in the conduit 217 and converter 30. The pressure in the conduits 420, 419 and 218 for the condition of operation shown in FIG. 4 is at a maximum value of full line pressure, and the regulated converter pressure in the conduit 217 is thus at a minimum, which, for one particular embodiment of the invention, is subsantially 30 lbs. per sq. in. It is noted that the conduit 250 which is also connected with the torque converter is connected with the cavity 232 of the secondary main regulator valve 163, and under certain conditions, this conduit may be connected with the conduit 253 leading to the sump 184. If the fluid pressure in the conduit 217 and thus in the converter 30 tends to increase to such a high value that the lubrication conduit 89 cannot take the full discharge of the pump 160 (and in addition the discharge from the pump 161 under conditions which will hereinafter be described), as for example, when the oil in the sump 184 is cold, the resultant increased pressure in the conduit 252 applied to the land face 242a will move the valve piston 230 still farther to the right against the action of the spring 249 so as to connect the port 234 with the port 240 through the groove 246 of the piston 230, so that fluid from the converter may discharge into the sump through the conduit 250, the groove 246, and the conduit 253. Under normal conditions of operation in which the oil in the sump 184 is at usual high operating temperatures, this discharge through the conduit 253 is not needed, and the excess oil is completely discharged through the lubrication conduit 89.

As will hereinafter appear, the pistons 98 and 113 for engaging the brakes 33 and 34 and the pistons 71 and 79 for engaging the clutches 31 and 32 are supplied with fluid pressure from the line pressure supply conduit 216 and the manual selector valve 164. The manual selector valve piston 255 in its neutral position as illustrated in FIG. 4 blocks the port 261 for the line pressure supply conduit 216, and thus there is no fluid pressure applied to any of these pistons for engaging any of these friction engaging mechanisms. The transmission is thus in its neutral condition.

Movement of the manual selector valve piston 255 to its "H" position causes a conection through the groove 267 of the ports 263 and 262 with the fluid pressure supply port 261. Line pressure is supplied through the port 263 to the conduit 269 and the 2–3 valve 166 and particularly to its port 303. This fluid pressure is blocked by the land 317 of the 2–3 valve piston 293, which is shown in its second speed position, and the 2–3 valve does not function to supply fluid pressure to any of the pistons for the clutches or brakes as it does for conditions of the hydraulic controls to be hereinafter described.

Line pressure is supplied through the groove 267 of the manual selector valve piston 255 to the port 262 and thence to the conduit 83 which is connected with the clutch piston 71. Line pressure is thus supplied to the clutch piston 71 and engages the clutch 31 with a minimum engaging pressure corresponding to the minimum line pressure that exists in the illustrated condition of the hydraulic controls with the accelerator 361 released. The restriction 272 in the conduit 83 functions to impede the flow of fluid to the clutch piston 71 and soften engagement of the clutch, although its final engaging pressure will be in accordance with the value of line pressure, as will be understood.

The conduit 289 is connected with the conduit 83, and line pressure is thus supplied to the governor valve 165 and particularly to its port 280. The governor valve 165 is a regulating valve that supplies a fluid pressure to the conduit 290 that increases with the speed of the driven shaft 26 with which the governor valve 165 rotates, and thereby with the speed of the vehicle, and since, in the condition of the hydraulic controls as shown in FIG. 4B, the driven shaft 26 and vehicle are stationary, the governor valve piston 275 and particularly its land 285 blocks the port 280, so that there is substantially no governor pressure in the governor output conduit 290. Although no governor pressure is illustrated in the conduit 290, actually there may be a very small pressure in this conduit, just sufficient to act on the two land faces 285a and 286a to move the valve into its illustrated position blocking the port 280. It will be observed that the governor conduit 290 is connected with the valve piston 275 by means of the port 281 through which fluid within the conduit 290 is applied to the land faces 285a and 286a. Pressure in the conduit 290 tends to move the piston 275 inwardly with respect to the axis of the shaft 26 since the land face 286a is so much larger than the face 285a.

The conduit 468 is connected with the conduit 83 as shown, and line pressure is applied to a land face 461a of the 1-2 valve piston 452 and moves the piston to the limit of its movement to the right. The valve piston 452 in this position connects the ports 460 and 456 around the reduced end 466 of the piston and connects the conduit 467 with the conduit 468. The conduit 257 is connected to supply line pressure to the chamber 102 in the brake servomotor 103, and line pressure in this chamber moves the piston 98 to the right against the action of the spring 99 into its brake engaging position in which it is illustrated.

The conduit 391 is connected with conduit 467, as has been described, and the line pressure in conduit 467 is applied through the conduit 391 to the piston 367 of the TV modulator valve 169. The fluid pressure functions to move the piston against the ring 370s forming an end of the cavity 370 and moves the piston 368 along with the piston 367, all against the action of the spring 385. The TV modulator valve is thus put into condition for modulating or limiting throttle pressure, as will hereinafter be described.

Thus when the selector lever 138 and the selector valve piston 255 are moved into their "H" or high range positions from their neutral positions, the front clutch 31 and front brake 33 are both engaged, and the intermediate speed power train is completed through the transmission. The accelerator 361 is in its closed throttle position and the engine 363 is rotating at idling speed which may be in the vicinity of 450 revolutions per minute, and actually there is not sufficient power transmitted through the power train and in particular through the hydraulic torque converter 30 for driving the driven shaft 26 and the vehicle; however, the drive may be made effective for driving the vehicle by simply depressing the accelerator to open the throttle valve 362 of the engine 363 and thereby increasing the speed and power output of the engine. Prior to such depression of the accelerator, the torque converter "slips," that is, its impeller 36 rotates without any resultant rotation of the rotor 37. Since the vehicle is started through the torque converter 30, which has a variable "slip" dependent on the torque applied to it and has an infinite number of speed ratios, this start of the vehicle can be made very smooth and shockless.

Throttle opening movement of the accelerator, as has been described, provides the additional power for driving the vehicle in this speed ratio, and this movement of the accelerator also has other effects on the hydraulic control system including an increasing of the line pressure effective on the applying pistons for the front brake 33 and front clutch 31 for increasing the applying pressures in these mechanisms and an increasing of the fluid pressure within the converter 30.

The accelerator 361 acts on the throttle valve 168 through the intermediary of the downshift valve 167 to provide a throttle pressure in conduit 332 which is less than line pressure (as in conduit 216), which throttle pressure increases from zero at closed throttle position of the accelerator to line pressure at open throttle accelerator position. The throttle valve 168, like the valves 162 and 163, is a regulator valve, providing a variable fluid pressure by metering fluid flow between a valve land and a valve port in accordance with variable forces impressed on the valve. The accelerator 361 tends to move the piston 335 of the throttle valve 168 to the right upon depression of the accelerator by means of the link 360, the downshift valve piston 333 and the spring 356. Such movement of the throttle valve piston 335 provides a connection between the ports 340 and 338 through the groove 353 of the piston 335 admitting fluid under pressure into the conduit 332 through the port 338. This fluid in the conduit 332 is effective on the faces 350a and 351a of the lands 350 and 351 through the restriction 357 and port 339. Since the land 350 is of larger diameter than the land 351, the fluid pressure on these land surfaces tends to move the valve piston 335 back to the left against the action of the spring 356, so that the land 350 tends to again close the port 340 and block further admittance of fluid pressure to the conduit 332. The greater the depression of the accelerator, the greater will be the force from the spring on the throttle valve piston 335 and the greater must be the pressure on the conduit 332 for closing the port 340 by the land 350, and hence the valve 168 has a regulating action to provide a throttle pressure in the conduit 332 which increases with accelerator depression.

The valve 168 is similarly effective to decrease the throttle pressure in the conduit 332 with a return of the accelerator 361 toward its closed throttle position so that the throttle pressure will have a value corresponding to any particular accelerator depression, by relieving the throttle pressure in the conduit 332 through the port 338, the groove 353 and the bleed port 341 adapted to discharge into the sump 184. If the throttle pressure in the conduit 332 is at a higher value than that which corresponds to the particular accelerator depression existing at the time, as when the accelerator is so released, the throttle pressure acting through the port 339 on the land faces 350a and 351a will move the throttle piston 335 to vent the port 341 with respect to the port 338. There is leakage from the throttle pressure conduit 332 through the various valves connected with it which also acts to reduce the pressure in the conduit 332, so that for any constant accelerator depression, the valve piston 335 meters fluid flow between its land 350 and an edge of the port 340. The valve 168 and its connections are such that the increase in throttle pressure in the conduit 332 takes place preferably for movements of the accelerator between its closed throttle position and a medium throttle position, and at extremely wide open throttle positions of the accelerator, the downshift valve piston 333 abuts and mechanically moves the throttle valve piston 335 to move the land 350 off the port 340 and thus cause full line pressure to exist in conduit 332. Since the throttle valve 168 is supplied by line pressure in conduit 358, the maximum throttle pressure than can exist at any particular time equals the line pressure at the particular time. The restriction 357 connected with the port 339 is for the purpose of preventing hunting and undue vibration of the valve piston 335 and is similar in this action to the restriction 215 in the primary main regulator valve 162.

For one particular embodiment of the invention, the throttle pressure in conduit 332 and varied from zero pressure for openings of the throttle between zero and 7% to 75# per sq. in. at approximately 53% throttle opening. As is indicated in FIG. 4d, the valve 362 is normally held at a 3% throttle opening position which supplies sufficient fuel to the vehicle engine 363 so that it runs at an idling speed of 450 revolutions a minute, for example, and an additional opening of the valve 362 between 3% and 7% may occur without actuating the throttle valve piston 168 to provide throttle pressure in the conduit 332. Assuming that the line pressure in conduit 358 is at its minimum value of 75# per sq. in., further throttle openings will not function to increase the throttle pressure in conduit 332 any further; however, if the line pressure in conduit 358 is greater, the throttle pressure will increase to the particular value of line pressure existing. At 85% throttle opening, the downshift valve piston 346 contacts the throttle valve piston 335 and completely opens the port 340, and the throttle pressure in the conduit 332 immediately increases to line pressure, assuming that the line pressure is greater than the throttle pressure just before a throttle opening of 85% is reached.

The throttle pressure from the throttle valve 168 is supplied through the conduit 332 to the TV modulator valve 169. The valve 169 functions to provide a limited or so called modulated TV pressure in the conduit 387 when the piston 368 of this valve is in its limiting or drained. This release of the pressure in the conduit 420 is obtained through the port 404, the groove 414 in the piston 392 and the bleed port 405, the valve piston 392 having been moved to the right so that fluid from the port 404 may meter past the land 410. The restriction 422 in the branch conduit 421 functions similarly to the restriction 215 used in connection with the primary main regulator valve 162 in inhibiting vibration of the valve piston 392.

When the vehicle begins to move, after the accelerator 361 has been moved toward its open throttle position to increase the speed and power output of the engine 363, the rear pump 161 begins its pumping action and draws fluid through the conduit 192 from the sump 184 and discharges it into the conduit 193. The check valve 220 remains closed, with its valve element 221 held on the seat 223 by line pressure in conduits 216 and 193 and by the spring 224, until the pressure of the fluid discharged by the rear pump 161 increases to a sufficient value to overcome the forces due to the line pressure and the spring 224, and at this time the check valve 220 opens and the rear pump discharges into the conduit 216. The fluid flow through the conduit 219 then reverses and closes the check valve 225, moving the valve element 226 on to its seat 228. The closing of the check valve 225 blocks discharge by the front pump 160 into the line pressure conduit 216 and its connected conduits, and the rear pump now becomes the sole supply of line pressure for conduit 216 and connected conduits. Since the check valve 225 is closed, the rear pump 161 cannot discharge through the conduits 219 and 183 and the port 203, and the discharge from the rear pump 161 must be taken care of in another way. When the check valve closes, the line pressure in conduit 216 increases slightly and is impressed on the land faces 205a and 206a of unequal area through the passage 215 and moves the valve piston 194 slightly to the right so as to provide an outlet for the excess fluid discharged from the rear pump between an edge of the port 201 and the land 207. The line pressure is now regulated exactly as has been previously described, except that it is slightly higher in value and is metered between the land 207 and an edge of the port 201 instead of between an edge of the port 203 and the land 208. The port 203 is substantially completely opened by the land 208 in the moved position of the valve piston 194, and the front pump 160 now discharges against only the pressure in the conduit 217 and in the converter 30 which is substantially less than line pressure. The front pump now functions solely to supply fluid under pressure to the converter 30 and for lubrication by means of the conduit 89 through the intermediary of the secondary main regulator valve 163, and the rear pump, as has been described, is the sole supply of line pressure in the conduit 216, while the excess fluid discharged from the rear pump escapes between an edge of the port 201 and land 207 for augmenting the fluid supply for the converter and lubrication.

As the throttle is depressed and the vehicle speed increases, the pressure in conduits 419 and 218 tends to move the regulator valve piston 194 to the right against its spring 214, and this tends to more fully open the port 201 to vent the pressure supply line 216 after the check valve 225 has closed, as above described, or more fully open the port 203 to vent the conduit 216 before closure of the check valve 225. When the pressure in conduits 419 and 218 is reduced from full line pressure, the valve piston 194 tends to move to the left under the influence of its spring 214, since the pressure on the land faces 208a and 209a tending to move the piston 194 to the right is decreased, and the piston 194 will not move to open the supply conduit 216 through the port 201 or 203 until a higher pressure is reached in the conduit 216. The piston 194 thus maintains the line pressure in the conduit 216 at a higher value corresponding to the decreased pressure in conduits 419 and 218.

The compensator pressure in conduit 419, which is reduced from line pressure, is effective on the secondary main regulator valve 163 for increasing the pressure in the converter 30; however, the increased discharge from the pumps 160 and 161 in itself has the effect of moving the piston 230 of the regulator valve 163 to the right as viewed in FIG. 4. The excess discharge from the rear pump 161 flows between the land 207 of the primary main regulator valve piston 194 and an edge of the port 201 into the conduit 217, and the discharge from the front pump 160 flows through the conduit 183 and the ports 203 and 201 into the conduit 217. This increased discharge has the effect of increasing slightly the pressure in the conduit 217 and in the torque converter 30, so that this pressure impressed on the land face 242a through the conduit 252 functions to move the valve piston 230 of the secondary main regulator valve 163 to the right. In the latter position, the land 244 of the valve opens the port 238 to the lubrication conduit 89 practically completely, and the valve meters fluid from the conduit 250 between an edge of the port 234 connected with this conduit and the land 243. The metering action of the land 243 has the effect of maintaining certain pressures in the conduits 217 and 250 and in the torque converter 30. Under these circumstances there is still some fluid flow from the conduit 217 through the ports 235 and 238 and the groove 247 to the lubrication conduit 89; however, most of the discharge from the pumps flows through the conduit 217 through the torque converter 30 and the converter outlet conduit 250, and past an edge of the port 234 and land 243 where it is metered and thence through the groove 246, port 240 and conduit 253 to the sump 184. Under unusual conditions, the valve piston 230 will also move still farther to the right against the action of the spring 249 due to the excess discharge from the pumps 160 and 161, as when the oil in the transmission is quite cold and viscous. Under these circumstances the valve piston 230 moves to at least partially uncover the port 237 by means of the land 244 so as to drain fluid from the conduit 217 through the port 235, the groove 247, the port 237 and the conduit 251 back to the inlet conduit 182 for the front pump 160. In this case, the metering action is by the land 244 coacting with the port 237. Generally the metering action by the valve piston 230 is by the land 243 coacting with the port 234, and, in this case, it is apparent that there is a continuous fluid flow from the conduit 217 through the torque converter 30 and thence through the converter outlet conduit 250, and this continuous fluid flow has the effect of cooling the converter and maintaining the oil within the transmission at safe operating temperatures.

Although, due to this movement of the valve piston 230, the converter pressure varies slightly with changes in output of the pumps 160 and 161, the sizable variations of converter pressure are with changes in vehicle speed and accelerator movement due to variation of the compensator pressure in conduit 419. The conduits 419 and 218 are in communication with the land faces 244a and 245a through the port 236 as has been previously described, and, pressure on these faces tends to move the piston 230 of the valve 163 to the right against the action of the spring 249. When the pressure in the conduits 218 and 419 is regulated by means of the compensator valve 170 to less than line pressure, this action on the land faces 244a and 245a decreases, so that the spring 249 is increasingly effective to block the relief port 234 or the relief ports 238 or 237, as the case may be, so as to increase the pressure in the conduit 217 and thereby in the converter 30 connected therewith. The valve 163 regulates as before, since converter pressure is applied on the land face 242a of the piston 230 through the conduit 252, but the regulated pressure in the converter is at a predetermined higher value corresponding to the compensator pressure in the conduits 419 and 218 which is less than line pressure. The higher fluid presmodulating position, with line pressure acting on piston 367 functioning to hold the piston 368 in this position. This limited pressure in conduit 387 is the same as the throttle pressure in conduit 332 up to a predetermined maximum value and for further increases in throttle pressure corresponding to increased openings of the engine throttle, the modulated TV pressure in conduit 387 remains at this predetermined value. The throttle pressure in conduit 332 flows through the port 375 of the TV modulator valve 169 and through the groove 384 and port 374 to the conduit 387. The pressure in conduit 387 is applied on the face 380a of the land 380 of the TV modulator valve piston 368 through the passage 389, and the effect of this application of pressure on the valve is to tend to move the piston 368 to the right against the action of the spring 385 so as to close the port 375 by means of the land 381. The modulated TV pressure in the conduits 387 and 389 and applied to the land face 380a, however, is not sufficient to move the valve piston 368 in this manner until the modulated TV pressure has reached this predetermined maximum value, after which the valve land 381 meters the flow of fluid through the port 375 and prevents a further increase in modulated TV pressure in conduit 387. The restriction 390 functions similarly to the restriction 215 in preventing undesired vibration of the associated valve piston which in this case is the piston 368. In the particular embodiment of the invention mentioned before, the modulated TV pressure had a maximum of 22 lbs. per sq. in. at about 25% throttle opening, and the modulated TV pressure remained constant for additional movements of the accelerator.

The modulated TV pressure in conduit 387 is applied to the compensator valve 170 for providing a compensator pressure in the conduit 419 that decreases with depression of accelerator pedal for initial throttle opening movements of the accelerator. The compensator pressure in conduit 419 also increases with the speed of the driven shaft 26 and of the vehicle due to action of the governor pressure in conduit 290, that increases with the speed of the shaft 26 and the vehicle, on the compensator valve 170. In this connection, the action of the governor valve 165 in producing such a governor pressure in conduit 290 will now be described.

The governor valve 165 is a regulator valve similar in many respects to the valves 162, 163 and 168 which are also regulator valves. The casing 276 for the governor valve piston 275 rotates with the driven shaft 26 of the transmission since the casing is fixed on the driven shaft, and the piston 275 tends to move outwardly in its cavities 278 and 279 under the influence of centrifugal force. Line pressure is present in conduit 289 and feeds through port 280, the groove 288 of the piston 275, and the port 281 into the conduit 290 to supply pressure to the latter conduit. The pressure in the conducit 290 is applied to the faces 285a and 286a of the lands 285 and 286 and tends to move the piston 275 inwardly of the valve casing 276, since the face 286a is of larger area than the face 285a, so that the land 285 will move over the port 280 and block any further admission of fluid pressure to the conduit 290. A balance is attained between the centrifugal force effective on the valve piston 275 tending to move the piston outwardly of the casing 276, which increases with vehicle speed, and the force derived from the fluid pressure in the conduit 290 effective on the land faces 285a and 286a tending to move the piston 275 inwardly, which increases with the pressure in conduit 290, for every speed of the driven shaft 26 so that thet valve piston 275 meters the flow of fluid under pressure to the governor output conduit 290 between the land 285 and an edge of the port 280 and provides a regulated governor pressure in the conduit 290 that increases with the speed of the driven shaft 26 and of the vehicle. The bleed passage 291 is provided for the purpose of relieving fluid pressure in the conduit 290 on a decrease in speed of the driven shaft 26, although the ordinary leakage about the valve piston 275 and other pistons connected with the conduit 290 may be expected to provide for such a decrease in governor pressure without the use of the passage 291 for gradual decreases in vehicle speed. Upon a sudden decrease in vehicle speed, there is a governor pressure in the conduit 290 greatly in excess of that corresponding to the reduced vehicle speed, and this pressure moves the governor piston 275 inwardly to connect the ports 283 and 282 by means of its groove 287 to drain this excessive fluid pressure from the conduit 290 through the passage 291. When the governor pressurre in the conduit 290 reaches the decreased value corresponding to the decreased vehicle speed, the pressure in the conduit 290 effective on the land faces 285a and 286a is ineffective to hold the valve piston in its inwardly moved position, and it returns to block the port 282 by its land 285 and meter any additional flow to the condiut 290 between its land 285 and an edge of the port 280.

The governor pressure in conduit 290 which increases with the speed of the driven shaft 26 and of the vehicle is impressed through the port 401 on the piston 393 of the compensator valve 170 and tends to move the piston 393 and thereby the piston 392 in contact with it to the left, augmenting the action of the spring 417 in moving the piston 392 in this direction. The modulated TV pressure in conduit 387 is supplied through the port 399 of the compensator valve 170 to the land faces 407b and 408a of the piston 392. The land face 408a is of greater area than the face 407a since the land 408 is of larger diameter than the land 407, and the modulated TV pressure which varies with accelerator depression thus provides a force on the piston 392 varying with the degree of accelerator depression tending to move the piston 392 to the right against the action of the spring 417 and the piston 393.

The compensator valve 170 is also a regulator valve, and it functions to provide a regulated compensator pressure in conduits 420 and 419 that decreases with increased throttle openings and increases with increased speed of the shaft 26 and of the vehicle. In its regulating condition, the valve piston 392 meters line pressure from the conduit 418, the port 403 and the groove 415, between its land 410 and a side of the port 404 into the conduits 420 and 419. Increased governor pressure in the conduit 290 applied to the piston 393 tends to augment the action of the spring 417 in moving the piston 392 to the left to open a greater part of the port 404 by moving the land 410 off the port, so that fluid flow to the conduit 420 is greater. The modulated TV pressure in conduit 387 which increases with accelerator movement acts on the land faces 407b and 408a tending to move the piston 392 in the opposite direction and increasingly block the port 404 with the land 410. The compensator pressure in conduit 420 is also effective on the land end 407a of the piston 392 through the conduit 421, and this pressure acts in the same manner as the modulated TV pressure in tending to move the piston 392 to the right to further close the port 404. These four forces on the piston 392, namely, those due to the governor pressure in conduit 290, the spring 417, the modulated TV pressure on land faces 408a and 407b and the compensator pressure on land face 407a balance each other so as to produce the compensator pressure in conduit 419 that decreases with increased throttle opening and increases with the speed of the driven shaft 26 and of the vehicle, the fluid into the conduit 420 for the regulating conditions of the piston 392 being metered past the land 410 and a side of the port 404. There is, of course, fluid leakage from the conduit 420 through the various valves connected therewith tending to decrease the pressure in the conduit 420, so that, for constant accelerator positions and vehicle speeds, the valve piston 392 is in its metering position; however, for a rapid movement of the accelerator toward its open throttle position, the pressure in the conduit 420, in order to have a sudden decrease corresponding with this changed accelerator position, must be suddenly sure necessary for increased torque transmittal through the torque converter 30 is thus supplied to the torque converter with a depression of the accelerator 361.

Figure 5:
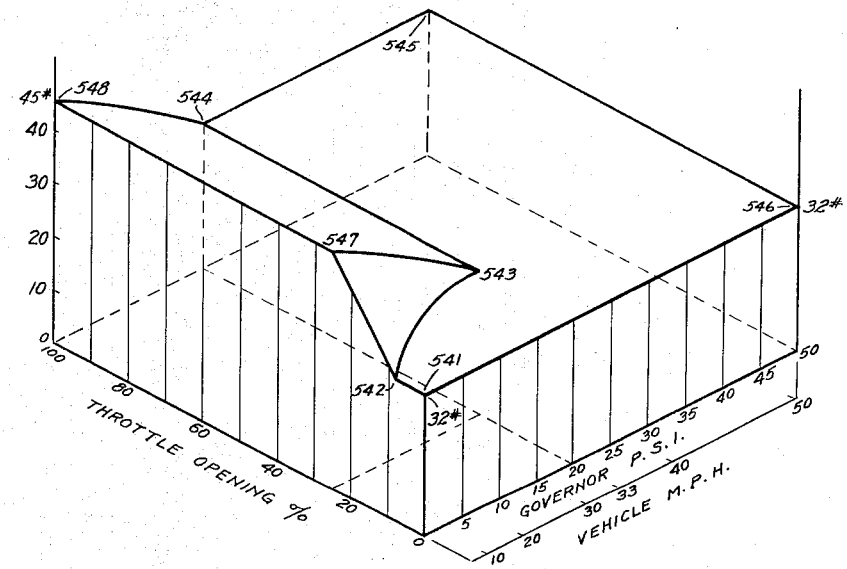
FIGURE 5 is a graph showing the variations of converter pressure in high range operation of the transmission with variations in throttle opening and vehicle speed.

The variations of converter pressure with changes in vehicle speed and accelerator movement are shown in FIG. 5, for the particular embodiment of the invention above referred to. The converter pressure is shown on the surface bounded by the points 541, 542, 543, 544, 545 and 546, the surface bounded by the points 542, 543 and 547 and the surface bounded by the points 543, 547, 548 and 544. The converter pressure varies quite substantially with changes in the viscosity and temperature of the oil used in the transmission, and hence the values shown in this graph are very approximate and may be considered average values. As is apparent from the graph, above approximately 33 m.p.h. of the vehicle, the converter pressure is at a minimum, being on the plane bounded by the points 541, 542, 543, 544, 545 and 546. Below this vehicle speed, the converter pressure will rise with a depression of the accelerator, the rise being on the surface bounded by the points 542, 543 and 547. Above approximately 25% throttle opening and below 33 m.p.h., the converter pressure will be indicated by a point on the surface bounded by the points 547, 543, 544 and 548. As is apparent, as the vehicle speed increases, with the pressure being indicated by this latter surface, the pressure will decrease toward its minimum value indicated by the surface bounded by the points 541, 542, 543, 544, 545 and 546.

The throttle pressure in conduit 332 which increases with the depression of the accelerator 361 and opening of the engine throttle valve 362 is also effective on the 3–2 control valve 173, the low regulator valve 171 and the 2–3 valve 166, in addition to the compensator valve 170. The throttle pressure is effective through conduit 483 and port 475 on the land end 476a of the valve piston 469 of the 3–2 control valve 173 and moves the piston 469 against the action of the spring 479 to the limit of its movement to the right. Throttle pressure is also applied on the land faces 439a and 440a of the valve piston 424 of the low regulator valve 171 through the conduit 451 and port 435. Since the land face 439a is considerably larger than the land face 440a, the piston 424 and thereby the piston 423 are held at the limit of their movements to the left; however, this valve in this condition of the hydraulic control system has no particular function.

The throttle pressure in conduit 332 which increases with accelerator depression is applied also to the 2–3 valve 166 and tends to hold the piston 293 of the valve, which is the actual speed changing portion of the valve, in its intermediate speed position. The throttle pressure is applied to the land face 313a and the reduced end portion 314 of the piston 292 of the 2–3 valve 166 and moves the piston 292 to the right, against the action of the spring 326 disposed between the piston 292 and the land 316 of the piston 293. Such movement of the piston 292 causes its land 313 to uncover the port 311 and admit fluid pressure from the conduit 332, through the port 312, the cavity 296, the port 311, the passage 331 and the port 310 to the cavity 297 and the fluid pressure in the cavity 297 is applied to both the face 316a of the land 316 formed on the piston 293 and also on the reduced end portion 315 and on the face 313b of the land 313 on the piston 292. This fluid pressure within the cavity 297, as it increases, tends to move the piston 292 back with the assistance of the spring 326, so that the land 313 again covers the port 311. An increase in throttle pressure in conduit 332 tends to move the valve piston 292 to the right to again uncover the port 311 and admit additional fluid under pressure within the cavity 297. This movement of the piston 292 is against both the force due to the spring 226 and is also against the force due to the regulated throttle pressure which has built up in the cavity 297 and is effective on the reduced end 315 and land face 313b of the piston 292. Both of the latter forces are effective to tend to move the valve piston 292 in the opposite direction to close the port 311 by the land 313. The valve piston 292 thus meters fluid flow from the conduit 332 between an edge of the port 311 and the land 313 to provide the regulated throttle pressure in the conduit 331 and cavity 297, and since both regulated throttle pressure and also the spring 326 are effective on piston 292, the regulated throttle pressure is at a predetermined less value than the throttle pressure.

In order for the regulated throttle pressure within the cavity 297 to decrease with a corresponding decrease in throttle pressure in conduit 332, as when the accelerator is suddenly moved toward its closed throttle position, the cavity 297 is drained through the port 302, the conduit 327, the port 344 in the valve 167, the groove 348, the port 345, the conduit 270, the port 260 of the manual selector valve 164, the groove 268 and the port 258. In this case the metering action is between the land 313 and the edge of the port 302. As will be further illustrated, the throttle pressure and regulated throttle pressure reach maximum values at a partially open throttle position of the accelerator, and hence the port 345 is open to the groove 348, rather than being closed by the land 346 of the downshift valve piston 167, when a release of the regulated throttle pressure in cavity 297 is necessary for maintaining it coordinated with the throttle pressure in conduit 332 which has similarly decreased. The net effect of the piston 292 is thus to regulate in a manner similar to the action of the other regulating valves to provide the regulated throttle pressure in conduit 331 and cavity 297 which is always less by a predetermined amount than the throttle pressure in conduit 332.

The regulated throttle pressure is also applied to the faces 322a and 323a of the lands 322 and 323 of the piston 294 through the conduit 330. Since the face 322a is considerably smaller in area than the face 323a, the effect of the regulated throttle pressure in the conduit 329 is to provide a force on the piston 294 tending to hold the piston against movement to the left as seen in the figure. This force acts in unison with that due to the regulated throttle pressure on the land face 316a in tending to hold the two pistons 293 and 294 from moving as a unit to the left, as is apparent.

The governor pressure in conduit 290 is applied through the conduit 329 and port 307 to the right end of the piston 294 in the 2–3 valve 166 including the land face 323b, and this pressure tends to move the piston 294 and thereby the piston 293 in contact with it to the left. The governor pressure is also applied to the faces 316b and 317a of the lands 316 and 317 respectively through the conduit 329, and since the face 316b is considerably larger than the face 317a in area, the net effect of the governor pressure applied to these faces is to tend to assist the force just described, in connection with the piston 294, in moving the piston 293 to the left against the action of the springs 325 and 326.

The valve piston 293 is the actual portion of the 2–3 valve 166 causing a change between the intermediate and high speed drives as will hereafter appear. The governor pressure impressed on the land 323 and on the lands 316 and 317 tends to move the pistons 293 and 294 to the left to move the piston 293 into a high speed drive position, and this effect of the governor pressure is opposed by the regulated throttle pressure acting on the land 316 and on the lands 322 and 323, the spring 325 acting on the piston 293, and the throttle pressure acting through the piston 292 and the spring 326 on the piston 293 all of which tends to hold the pistons 293 and 294 from movement to the left. The shift forces due to the governor pressure at the low vehicle speed existing are not high enough relative to the sum of these opposing forces to actually move the pistons 293 and 294, so that these pistons remain in their intermediate or second speed positions.

The low inhibitor valve piston 486 has governor pressure impressed on it through the conduits 290 and 503, the ports 492 and 493, the conduit 504 and the port 495. The governor pressure is effective on the right end of the piston 486 including the land end 497a and is effective through the conduit 504 on the left end of the piston 486 including the face 496a and the reduced end portion 499. Since the right end of the piston 486 has a larger area than its left end, the effect of the governor pressure on the piston 486 is to tend to move it to the left as seen in FIG. 16, against the action of the spring 500, but this movement of the piston 486 does not occur until a higher speed of the vehicle is reached than that for which the hydraulic controls are illustrated in this figure. The low inhibitor valve thus has no function in the condition of the hydraulic controls in which they are illustrated in this figure.

As the speed of the vehicle increases in second speed ratio, the governor pressure in conduit 290 increases, and this is impressed on the compensator valve 170 tending to move its piston 392 toward the left to more fully open the port 404 and provide an increased compensator pressure in conduits 419 and 420.

The increased compensator pressure in conduits 420, 419 and 218 acts on the primary main regulator valve 162 and tends to move its piston 194 farther to the right, so as to increase the opening between the land 207 and the edge of the port 201 for further relieving the line pressure in the conduit 216 and decreasing the line pressure.

As has been previously explained, the torque conversion in the hydraulic torque converter 30 generally decreases with increases in vehicle speed, and the torque transmitted through the transmission decreases similarly, so that the holding power of the various friction engaging mechanisms completing the drive, such as the front clutch 31 and front brake 33, may be decreased without slippage, and hence the line pressure applied to engage the friction engaging mechanisms is decreased. The rear pump 161 is the sole supply of line pressure after the vehicle has started moving, and this pump thus pumps against a reduced line pressure and requires less power for driving the pump.

The increased compensator pressure in conduits 419 and 218 is applied to the secondary main regulator valve 163 and tends to move its valve piston 230 farther to the right to further open the port 234 to decrease the converter pressure in conduits 250 and 217. For the particular embodiment of the invention above referred to, FIG. 5 may be referred to for a graph showing the variations in converter pressure, and, under these conditions, the converter pressure is found on the surface bounded by the points 547, 548, 544 and 543, and this converter pressure decreases on this surface with increases in vehicle speed, as is apparent from the graph.

As has been explained, the torque conversion in the torque converter decreases, generally with increases in vehicle speed, and the one-way brake 43 releases and the stator 38 begins to rotate when a one to one speed ratio through the converter 30 is approached with increases in vehicle speed and I have found that the fluid pressure required for the drive through the torque converter decreases with such decreases in torque conversion. The system thus has been designed to decrease the converter pressure with increases in vehicle speed. After the rear pump 161 has become the sole supply of line pressure, the front pump 160 is the sole supply of converter pressure, and the front pump 160 pumps against a reduced converter pressure with increased vehicle speed resulting in a decreased power requirement for driving the front pump.

At high vehicle speeds the governor pressure in conduit 290 acting on the compensator valve 170 is sufficiently great so that the output pressure of the compensator valve in conduit 420 is equal to line pressure, the compensator valve piston 392 being moved to the limit of its movement to the left to admit line pressure from the conduit 418 through the port 403, groove 415 and port 404 to the conduit 420. The pressure applied to the land faces 209a and 208a of the primary main regulator valve piston 194 is thus line pressure, application being made through the conduits 419 and 218, so that the piston 194 tends to move to the right to connect the ports 200 and 201 to a greater extent thereby regulating the line pressure in conduit 216 and connected conduits to a minimum. This line pressure from conduit 419 is also applied through conduit 218 to the land faces 244a and 245a of the secondary main regulator valve piston 230 tending to move this valve piston farther to the right against the action of its spring 249 so as to tend to drain fluid from the conduits 250 and 217 to the discharge conduits 251 and 253, respectively, thereby decreasing the pressure in the converter 30 to a minimum. The discharge of the pumps 160 and 161 is sufficiently great so that the secondary main regulator valve piston 230 is moved to the right to connect the conduits 217 and 251, metering the fluid between the land 244 and an edge of the port 237.

The manual selector lever 138 is moved by the vehicle operator into its "L" or low range position to condition the transmission and controls for low range operation, and the manual selector valve piston 255 is also thereby moved into its "L" position. The selector valve piston 255 in its "L" position connects the ports 260, 261 and 262 by means of its groove 267, as shown. The conduit 216 connected with the port 261 thus supplies pressure to the conduit 83 connected with the port 262 and also with the conduit 270 connected with the port 260. The conduit 83, similar to its function in the high range condition of the hydraulic control system, supplies fluid under pressure to the piston 71 for engaging the front clutch 31 and also supplies fluid pressure through the conduit 289 to the governor valve 165. The conduit 468 connected with the conduit 83 supplies line pressure, as in high range operation, to the 1-2 valve 172; however, in low range operation, the 1-2 valve blocks the conduit 468 and its port 460 by its land 461.

The conduit 270 connected with the port 260 is also supplied with line pressure, as has been mentioned, and this conduit is connected with the piston 113 for the rear brake 34 for applying this brake, the connection being through the conduit 502, the port 491, the groove 498 of the low inhibitor valve piston 486, the port 490, the conduit 501, the conduit 449, the port 433, the cavity 428 of the low regulator valve 171, the port 434, and the conduit 450 to the brake piston 113. Both the front clutch 31 and the rear brake 33 are thus applied, and the low speed power train through the transmission is completed.

Line pressure is applied to the right end of the piston 368 of the TV modulator valve 169 from the conduit 501 and through the conduit 386 and port 372, assisting the spring 385 in holding the piston to the limit of its movement to the left. In this position of the piston 368, its groove 384 connects the ports 376, 375 and 374 so that throttle pressure in the conduit 332 connected with the port 375 is supplied also to the conduits 387 and 388 connected respectively with the ports 374 and 376. Throttle pressure is applied also to the face 380a of the land 380 on the TV modulator valve piston 368 through the branch conduit 389 tending to move the piston 368 to the right; however, it is not sufficient to overcome the effect of line pressure applied through the conduit 386 on the right end of the piston 368.

The throttle pressure in conduits 387 and 388 is applied to the faces 407b, 408a, 408b and 409a on the lands 407, 408 and 409 of the compensator valve piston 392, and since the land 408 is larger than the land 407 and the land 409 is larger than the land 408, the net effect of the throttle pressure on the piston 392 is to force it to the right against the action of the spring 417 to the limit of its movement in this direction. The governor pressure in conduit 290 is effective on the piston 393 tending to move it and the piston 392 to the left; however, it is not sufficient to overcome the action of the throttle pressure.

The compensator valve piston 392 in its illustrated position blocks line pressure from the conduit 418 and its port 403 to the port 404 and the connected compensator pressure conduit 420, and there is thus no pressure within the latter conduit. Since there is no pressure in the conduit 420 and connected conduits 419 and 218 applied to the primary main regulator valve 162, there is no counteracting action on the spring 214 of this valve from this source; and the primary main regulator valve functions to provide an increased line pressure, for example, 175 lbs. per sq. in., in the conduit 216. The secondary main regulator valve 163 functions similarly with no fluid pressure in the conduit 218 impressed on it to provide an increased fluid pressure in the converter 30, higher than any provided in high range operation of the transmission.

Figure 6:
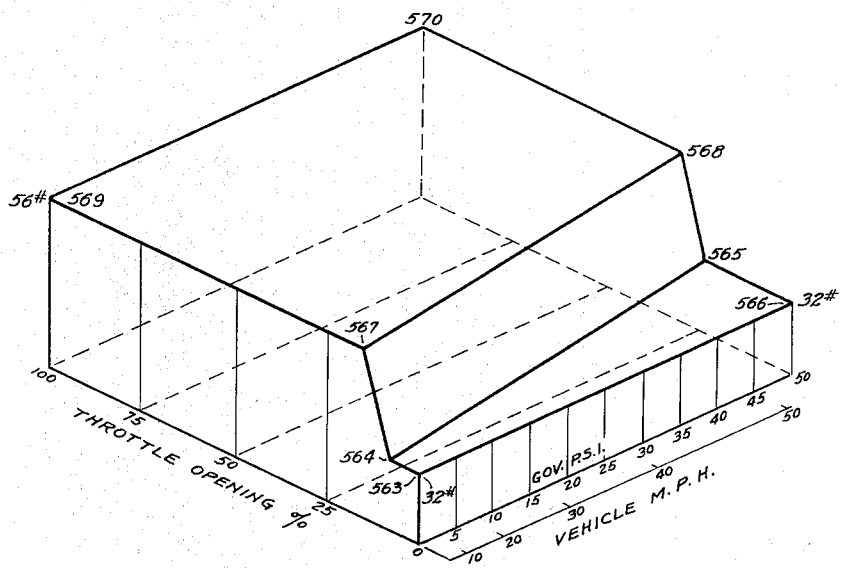
FIGURE 6 is a graph showing variations of converter pressure in low range operation of the transmission with changes in throttle opening and vehicle speed for this particular embodiment.

The graph in FIG. 6 shows the variations of converter pressure in low range. The values shown are only approximate for reasons previously mentioned. For initial throttle openings, the converter pressure is found on the surface bounded by the points 563, 564, 565 and 566 and is at a minimum value of 32 lbs. per sq. in. For additional throttle openings, the converter pressure rises quickly and is found on the surface bounded by the points 564, 567, 568 and 565. For still additional throttle openings, the converter pressure is at its maximum of 56 lbs. per sq. in. and is found on the surface bounded by the points 567, 569, 570 and 568.

My improved transmission control mechanism also includes means for varying the fluid pressure in the hydraulic torque converter with the vehicle speed and with the depression of the vehicle accelerator. In general, the converter will convert torque at lower vehicle speeds and with increased accelerator depressions, and my control mechanism accordingly increases the fluid pressure in the converter either with increased accelerator depression or with decreases in vehicle speed. I have found that lower charging pressures of the hydraulic torque converter may be used when the torque converter is acting as a fluid coupling instead of converting torque.

The transmission control mechanism includes a simple system for varying the engaging pressure for the friction engaging mechanisms and for varying the fluid pressure in the torque converter in the manner just mentioned which includes a regulating relief valve for each of these pressures, a compensator valve providing a compensating pressure acting on both of these relief valves, a governor valve providing a governor pressure that increases with the vehicle speed and is applied to the compensator valve and a throttle valve that provides a throttle pressure that increases with accelerator depression and is applied to the compensator valve. The compensator pressure will thus change inversely as the converter pressure and as the pressure for engaging the friction engaging mechanisms, namely, the compensator pressure will decrease with accelerator depression and will increase with vehicle speed.

The hydraulic control system also includes the TV modulator valve which is active in high range for restricting the throttle pressure applied to the compensator valve to a predetermined maximum and which allows full throttle pressure application to the compensator valve in low range or first speed drive for thereby providing higher pressures for engaging the friction engaging mechanisms for low range.

I wish it to be understood that my invention is not to be limited to the specific constructions and arrangements shown and described except only insofar as the appended claims may be so limited, as it will be apparent to those skilled in the art that changes may be made without departing from the principles of the invention. In particular, I wish it to be understood that the invention is not at all limited to the specific values of the various pressures shown in FIGS. 5 and 6, inasmuch as these particular pressure values were only intended to be illustrative with respect to a certain embodiment of the invention.

I claim:

1. In transmission mechanism, the combination of a drive shaft, a driven shaft, an engine driving said drive shaft and having a throttle and a throttle control, a hydraulic torque converter for driving said driven shaft from said drive shaft, a source of fluid pressure connected to supply fluid pressure to said hydraulic torque converter, first valve means under the control of said throttle control and connected with said pressure source for providing a throttle fluid pressure that increases with increased throttle openings, governor means connected with said pressure source and driven by said driven shaft for providing a governor fluid pressure that increases with driven shaft speed, a second valve means connected to said source of pressure and having said governor fluid pressure and said throttle fluid pressure impressed thereon whereby said second valve means provides a compensator fluid pressure which increases with increasing governor fluid pressure and decreases with increased throttle fluid pressure, a regulator valve connected to said pressure source and said second valve means whereby said compensator fluid pressure is impressed thereon, said regulator valve being adapted to supply fluid pressure to said torque converter that varies with variations in said compensator fluid pressure.

2. In a transmission mechanism, the combination of a drive shaft, a driven shaft, an engine for driving said drive shaft and having a throttle control, a hydrodynamic coupling device having fluid therein and completing a power train between said shafts, supply means to supply fluid to said hydrodynamic coupling device and to establish fluid pressure within said hydrodynamic coupling device, and valve means responsive to the position of the throttle control of said engine and the speed of the driven shaft for controlling said supply means for varying the pressure of fluid in said coupling device with variations in said position of the throttle control and variations in driven shaft speed.

3. In a transmission mechanism, the combination of a drive shaft, a driven shaft, an engine driving said drive shaft and having a throttle, a control for said throttle, a hydrodynamic coupling device having fluid therein and completing a power train between said shafts, fluid supply means to supply fluid to said hydrodynamic coupling device and to establish fluid pressure in said hydrodynamic coupling device, a valve under the control of said throttle control for controlling said fluid supply means to increase the pressure of the fluid in said hydrodynamic device with an increase in opening of the throttle, and means responsive to an operating condition of said transmission mechanism to control said valve for controlling said fluid supply means to decrease the pressure of fluid in said hydrodynamic coupling device.

4. In a transmission mechanism, the combination of a drive shaft, a driven shaft, a hydrodynamic coupling device having fluid therein and completing a power train between said shafts, fluid supply means to supply fluid to said hydrodynamic coupling device and to establish fluid pressure in said hydrodynamic coupling device, control means responsive to the speed of rotation of said driven shaft, a valve under the control of said control means for controlling said fluid supply means to decrease the pressure of the fluid in said hydrodynamic device with an increase in speed of rotation of said driven shaft, and means responsive to an operating condition of said transmission mechanism to control said valve for controlling said fluid supply means for increasing the pressure of fluid in said hydrodynamic coupling device.

5. In a transmission mechanism, the combination of a drive shaft, a driven shaft, an engine connected to drive said drive shaft and having a throttle, a control for said throttle, a hydrodynamic coupling device having fluid therein and completing a power train between said shafts, fluid supply means to supply fluid under pressure to said hydrodynamic coupling device, means responsive to the speed of said driven shaft, and valve means connected to said supply means under the combined control of said speed responsive means and said throttle control for varying the supply of fluid to said coupling device to increase the supply of fluid to said coupling device as the opening of said throttle increases and to decrease the supply of fluid to said coupling device as the speed of said driven shaft increases.

6. In a transmission mechanism the combination of a drive shaft, a driven shaft, a hydrodynamic coupling device having fluid therein and completing a power train between said shafts, fluid supply means to supply fluid under pressure to said hydrodynamic coupling device, means responsive to the speed of said driven shaft, and valve means connected to said supply means under the control of said speed responsive means for varying the supply of fluid to said coupling device to decrease the supply of fluid to said coupling device as the speed of said output shaft increases, and means responsive to an operating condition of said transmission mechanism connected to said valve means to increase the supply of fluid to said coupling device.

7. In a transmission mechanism, the combination of a drive shaft, a driven shaft, an engine driving said drive shaft and having a throttle, a control for said throttle, a hydrodynamic coupling device having fluid therein and completing a power train between said shafts, fluid supply means to supply fluid to said hydrodynamic coupling device, a valve under the control of said throttle control for controlling said fluid supply means to increase the supply of fluid to said hydrodynamic device with an increase in opening of the throttle, and means to control said valve for controlling said fluid supply means to decrease the supply of fluid in said hydrodynamic coupling device.

8. In transmission mechanism, the combination of a drive shaft, a driven shaft, an engine for driving said drive shaft and having a throttle control, driven shaft control means responsive to the speed of said driven shaft, a hydrodynamic coupling device having fluid therein and completing a power train between said shafts, supply means to supply fluid to said hydrodynamic coupling device and to establish fluid pressure within said hydrodynamic coupling device, and pressure regulating valve means responsive to the position of the throttle control of said engine and driven shaft control means for controlling said supply means for varying the pressure of fluid in said coupling device with variations in the position of said throttle control and with variations in speed of the driven shaft.

References Cited by the Examiner
UNITED STATES PATENTS

| | | | |
|---|---|---|---|
| 2,014,944 | 9/1935 | Martyrer et al. | 60—54 |
| 2,018,616 | 10/1935 | Martyrer et al. | 60—54 |
| 2,603,984 | 7/1952 | Swift | 60—54 X |
| 2,631,432 | 3/1953 | Newcomb | 60—54 |

JULIUS E. WEST, *Primary Examiner.*